US011483381B1

(12) United States Patent
Gupta et al.

(10) Patent No.: US 11,483,381 B1
(45) Date of Patent: Oct. 25, 2022

(54) DISTRIBUTING CLOUD MIGRATION

(71) Applicant: INTERNATIONAL BUSINESS MACHINES CORPORATION, Armonk, NY (US)

(72) Inventors: Manish Gupta, New Delhi (IN); Murali Krishna Surampalli, Bangalore (IN); Sougata Mukherjea, New Delhi (IN); Ashraf Ali Thajudeen, Vriddhachalam (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/507,341

(22) Filed: Oct. 21, 2021

(51) Int. Cl.
   *G06F 15/16* (2006.01)
   *H04L 67/10* (2022.01)
   *H04L 43/0811* (2022.01)
   *H04L 43/10* (2022.01)

(52) U.S. Cl.
   CPC .......... *H04L 67/10* (2013.01); *H04L 43/0811* (2013.01); *H04L 43/10* (2013.01)

(58) Field of Classification Search
   CPC ....... H04L 67/10; H04L 43/0811; H04L 43/10
   See application file for complete search history.

(56) References Cited

U.S. PATENT DOCUMENTS 10,521,780 B1 * 12/2019 Hopkins, III .......... G06Q 20/12
11,061,910 B1 * 7/2021 Kondiles ........... G06F 16/24568

2014/0113727 A1 * 4/2014 Guest ...................... A63F 13/77
463/42

(Continued)

FOREIGN PATENT DOCUMENTS

CN 112134916 A 12/2020

OTHER PUBLICATIONS

Lichun Zhu, "A Distributed Task Management Solution for Peer-To-Peer and Cloud Environments", (2011). Electronic Theses and Dissertations, https://scholar.uwindsor.ca/etd/106, 101 pages.

(Continued)

*Primary Examiner* — Hua Fan
(74) *Attorney, Agent, or Firm* — Andrew M. Calderon; Calderon Safran & Cole, P.C.

(57) ABSTRACT

A method includes defining, by a computing device, a network of nodes of migration practitioners; receiving, by the computing device, working sets from the nodes defining ownership of data servers; determining, by the computing device, a consensus of ownership of the data servers amongst the migration practitioners; updating, by the computing device, the working sets using the consensus of ownership; distributing, by the computing device, the updated working sets across the nodes; obtaining, by the computing device, activity wrappers of migration activities on the data servers within the distributed working sets; generating, by the computing device, migration activities based on the obtained activity wrappers; determining, by the computing device, connectivity problems in the network; resolving, by the computing device, the connectivity problems in the network; allowing, by the computing device, a new node to join the network; and assigning, by the computing device, ownership of unowned data servers.

20 Claims, 16 Drawing Sheets

(56) References Cited

U.S. PATENT DOCUMENTS

2018/0246743 A1  8/2018  Rossier
2020/0142965 A1  5/2020  Weldemariam et al.
2021/0294858 A1* 9/2021  Kondiles ............. G06F 16/9038

OTHER PUBLICATIONS

Seungha Lee et al., "A Peer-to-Peer Based Job Distribution Model Using Dynamic Network StructureTransformation", https://link.springer.com/chapter/10.1007/978-3-642-40675-1_58, 2014, 3 pages.
Arunas Vrubliauskas, "Join/Leave Protocol for Structured P2P Networks", Master Thesis, Faculty of Engineering and Science, Aalborg University, SSE4, 10th semester Feb. 1-Jun. 10, 2003, 76 pages.
Christoph Schuler et al., "Peer-To-Peer Execution of (Transactional) Processes", https://www.worldscientific.com/doi/10.1142/S0218843005001183, International Journal of Cooperative Information Systems, vol. 14, No. 04, pp. 377-405, 2005, 2 pages.
Anwitaman Datta, "Load Balancing in Peer-to-Peer Overlay Networks", In: Liu L., Özsu M.T. (eds) Encyclopedia of Database Systems. Springer, Boston, MA. https://doi.org/10.1007/978-0-387-39940-9_1043, 2009, 4 pages.
Darkhan Akhmed-Zaki et al., "Peer-to-Peer MapReduce platform" ICAART 2013—Proceedings of the 5th International Conference on Agents and Artificial Intelligence. 2. 565-570, 2013, 7 pages.
Ozalp Babaoglu et al., "Escape From the Data Center: The Promise of Peer-To-Peer Cloud Computing", https://spectrum.ieee.org/escape-from-the-data-center-the-promise-of-peertopeer-cloud-computing, Sep. 22, 2014, 15 pages.
Mell et al., "The NIST Definition of Cloud Computing", NIST, Special Publication 800-145, Sep. 2011, 7 pages.
Khalifa et al., "Resilient Hybrid Mobile Ad-hoc Cloud Over Collaborating Heterogeneous Nodes", 10th IEEE International Conference on Collaborative Computing: Networking, Applications and Worksharing; Jan. 22, 2015, 10 pages.
Jingnan Yao et al., "Computing Real Time Jobs in P2P Networks", https://www.researchgate.net publication/221081476, Nov. 2006, 9 pages.
Unknown, "What is HTC Condor?", https://research.cs.wise.edu/htcondor/description.html, downloaded Oct. 19, 2021, 2 pages.
Eric Korpela et al., "SETI@Home—Massively Distributed Computing for SETI", Jan./Feb. 2001, 6 pages.

* cited by examiner

540

| Key | Value |
|---|---|
| /Data Server/465a/Owner/Practitioner/510 | "Ownership Requested" |

| Key | Value |
|---|---|
| /Data Server/465a/Owner/Practitioner/510 | "Ownership Requested" |
| /Data Server/465a/Owner/Practitioner/465a/Practitioner/510a | "disagree" |

| Key | Value |
|---|---|
| /Data Server/465a/Owner/Practitioner/510 | "Ownership Requested" |
| /Data Server/465a/Owner/Practitioner/465a/Practitioner/510b | "agree" |

| Key | Value |
|---|---|
| /Data Server/465a/Owner/Practitioner/510 | "Ownership Requested" |
| /Data Server/465a/Owner/Practitioner/465a/Practitioner/510c | "agree" |

FIG. 5F

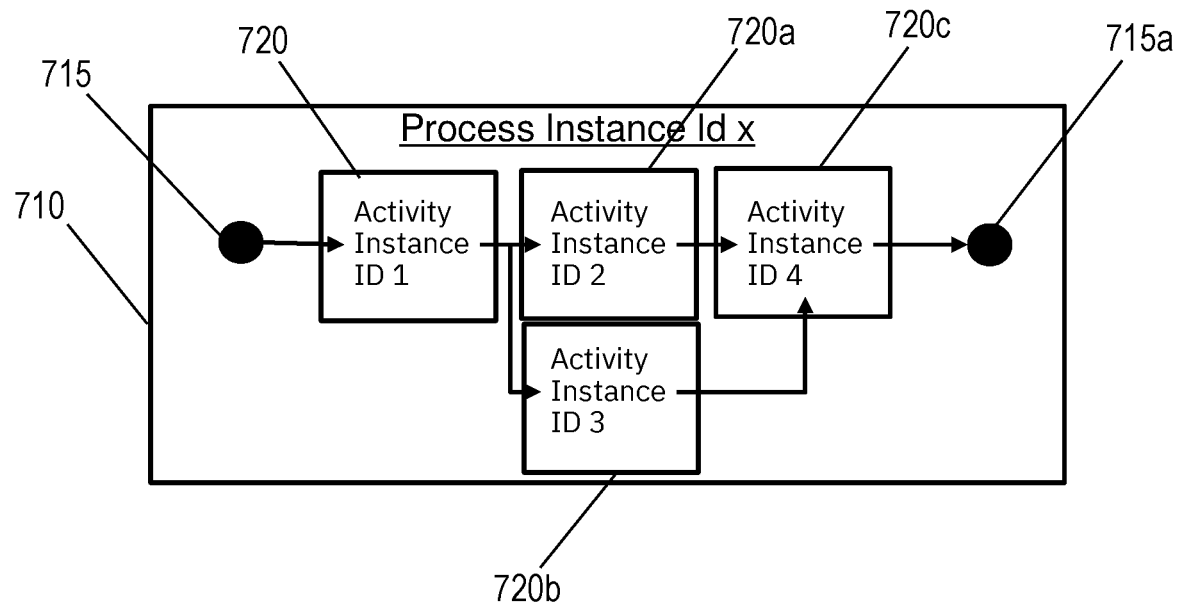

| Key | Value |
| --- | --- |
| /Process/x/invoker name id | John Doe |
| /Process/x/executing node | John'sLaptop |
| Process invoker name id | Process Instance Id x |
| /Activity/1/Node/<node id> from all the candidates | true |
| /Activity/1/Type | Activity Type A |
| /Type/A/Dependency/Connectivity | Connectivity to Client |
| /Type/A/Dependency/CPU | 4 vCPUs |
| /Activity/1/Executor | Up for takes – {<node id> of the failed node} |
|  |  |

FIG. 8B

DISTRIBUTING CLOUD MIGRATION

BACKGROUND

Aspects of the present invention relate generally to cloud migration and, more particularly, to distributing cloud migration.

Generally, there are multiple approaches for cloud migration processes. One approach is to use an intermediate application between a source server and a destination server. Another approach is to place tools directly on the user workstations and each such application component communicates with the others to present a single application view.

SUMMARY

In a first aspect of the invention, there is a computer-implemented method including: defining, by a computing device, a network of nodes of migration practitioners; receiving, by the computing device, working sets from the nodes defining ownership of data servers; determining, by the computing device, a consensus of ownership of the data servers amongst the migration practitioners; updating, by the computing device, the working sets using the consensus of ownership; distributing, by the computing device, the updated working sets across the nodes; obtaining, by the computing device, activity wrappers of migration activities on the data servers within the distributed working sets; generating, by the computing device, migration activities based on the obtained activity wrappers; determining, by the computing device, connectivity problems in the network; resolving, by the computing device, the connectivity problems in the network; allowing, by the computing device, a new node to join the network; and assigning, by the computing device, ownership of unowned data servers to the new node.

In another aspect of the invention, there is a computer program product including one or more computer readable storage media having program instructions collectively stored on the one or more computer readable storage media. The program instructions are executable to: identify node metadata of nodes of migration practitioners; define a network of the nodes using the node metadata; receive working sets from the nodes defining ownership of data servers; determine a consensus of ownership of the data servers amongst the migration practitioners; update the working sets using the consensus of ownership; distribute the updated working sets across the nodes; obtain activity wrappers of migration activities on the data servers within the distributed working sets; generate migration activities based on the obtained activity wrappers; determine connectivity problems in the network; resolve the connectivity problems in the network; allow a new node to join the network; and assign ownership of unowned data servers to the new node.

In another aspect of the invention, there is system including a processor, a computer readable memory, one or more computer readable storage media, and program instructions collectively stored on the one or more computer readable storage media. The program instructions are executable to: identify node metadata of nodes of migration practitioners; define a network of the nodes using the node metadata; receive working sets from the nodes defining ownership of data servers; determine a consensus of ownership of the data servers amongst the migration practitioners; update the working sets using the consensus of ownership; distribute the updated working sets across the nodes using; receive migration states of the data servers; obtain activity wrappers of migration activities on the data servers within the distributed working sets; generate migration activities based on the obtained activity wrappers; determine connectivity problems in the network; resolve the connectivity problems in the network; allow a new node to join the network; and assign ownership of unowned data servers to the new node.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIGS. 5A-5F show a consensus of ownership of data servers in accordance with aspects of the invention.

FIGS. 8A and 8B show a resolution of network connectivity problems in accordance with aspects of the invention.

DETAILED DESCRIPTION

Figure 1:
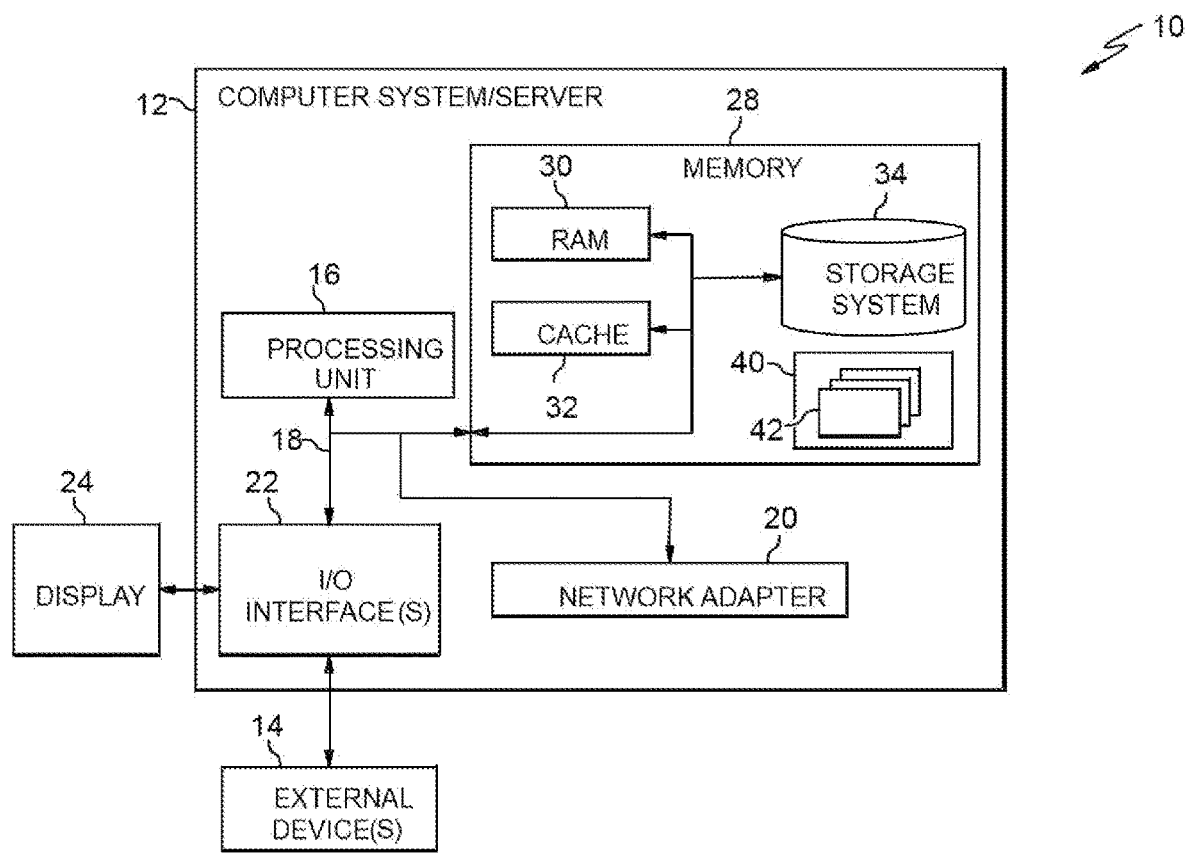
FIG. 1 depicts a cloud computing node according to an embodiment of the present invention.

Aspects of the present invention relate generally to cloud migration and, more particularly, to distributing cloud migration. According to aspects of the invention, the systems and processes leverage nodes of migration practitioners to distribute a cloud migration of data servers. In embodiments, to leverage the nodes, the systems and processes receive definitions of working sets and establish a consensus for the working sets so that specific migration practitioners migrate specific data servers. In embodiments, in view of the consensus, the systems and processes update the working sets and distribute them across the nodes to migrate the data servers. In this way, implementations of the invention reduce an infrastructure footprint and a reduce a cost for cloud migration by leveraging the nodes of migration practitioners.

In embodiments, the systems and processes provide for a consensus-based approach to a collaborative execution of a cloud migration process. In embodiments, the systems and processes obtain ownership of a user-defined distributing of endpoints called a working set and leverage the distributing consensus based on policies. In addition, the systems and processes allow for a distributing of the working sets across nodes for the purpose of state refresh tasks for a working set by a multitude of nodes. In embodiments, the systems and processes allow for a distributed migration state reconstruction by accessing server configurations from the target data centers. Additionally, the systems and processes allow for a peer node network formation by having a new node write its connection information to commonly available repositories, reading existing connection information, and then trying to join one of the specified peers. In embodiments, the systems and processes include a process and activity generator which generates work items by instrumenting the business workflow and dynamically managing their execution on other nodes based on their capabilities. In embodiments, the systems and processes include a collaborative network problem asserter which determines partial network connectivity failures of an executing node by leveraging other peer nodes to test connectivity and migrate the activity to a working node. In embodiments, another peer node is able to recognize the missing expected periodic tasks to the migration state which is the responsibility of a first peer node. Further, the systems and processes are able to identify the network failures from a peer to its destination and use this as a criterion to distribute the migration tasks, thereby enabling a continuity of work. In embodiments, the systems and processes include an asset migrator, which detects anomalies in a request execution and migrates them to other nodes. In embodiments, the systems and processes run migration activities for a migration process in a collaborative manner from one or more participating peer nodes. In embodiments, the systems and processes allow for a distributed allocation of data and log gathering activities to peers from tools and servers in a client environment.

Implementations of the invention provide improvements to computer technologies by leveraging computing resources to reduce a consumption of computing resources during a migration of data servers by removing an intermediate application. Specifically, the systems and processes leverage nodes of migration practitioners to run a distributed data migration process, thereby reducing a reliance on an intermediate application for migration of the data servers. In embodiments, the systems and processes leverage the nodes by receiving working sets, which defines which migration practitioner is migrating which data servers. In response to receiving the working sets from the migration practitioners, the systems and processes establish a consensus for ownership over the data servers so that a data server does not appear in more than one working set, thereby ensuring that only one migration practitioner is migrating that specific data server and not another migration practitioner. In embodiments, in response to the consensus of ownership, the systems and processes update the working sets to reflect the consensus of ownership. In embodiments, in response to updating the working sets, the systems and processes determine server migration states in a parallel manner as the data migration continues. To determine the server migration states, the systems and processes distribute the updated working sets across the nodes to create distributed working sets and determine the migration state for each data server in the distributed working sets. In this way, the systems and processes allow for the nodes to continue migrating the data server at the correct migration state, while not having to store all the server migration states of all the working sets. Accordingly, the systems and processes further reduce a consumption of computing resources by minimizing the storing of the server migration states by the nodes.

Implementations of the invention also allow for the practical application of reducing a computing infrastructure footprint by removing an intermediate application from the data migration process. In embodiments, to remove this intermediate application, the systems and processes leverage nodes of migration practitioners to run a distributed data migration process, in lieu of using the intermediate application to migrate the data servers. Specifically, the systems and processes leverage the nodes by receiving working sets from the migration practitioners, with each working set defining which data server a migration practitioner is migrating during the data server migration process. In response to receiving the working sets, the systems and processes establish a consensus amongst the migration practitioners regarding ownership of the data servers so that migration practitioners are not migrating the same data server. In embodiments, in response to the consensus of ownership, the systems and processes update the working sets to reflect the consensus. In embodiments, in response to the updated working sets, the systems and processes determine server migration states in a parallel manner as the data migration continues. In further embodiments, to determine the server migration states, the systems and processes distribute the updated working sets across the nodes and determine a server migration state by accessing a source location, so that the migration practitioner continues migrating the data server from the correct state. In this way, the systems and processes allow for the nodes to not have to store all the server migration states of all the updated working sets, while knowing the correction server migration state to continue from. Accordingly, the systems and processes further reduce a consumption of computing resources by minimizing the storing of the server migration states by the nodes.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
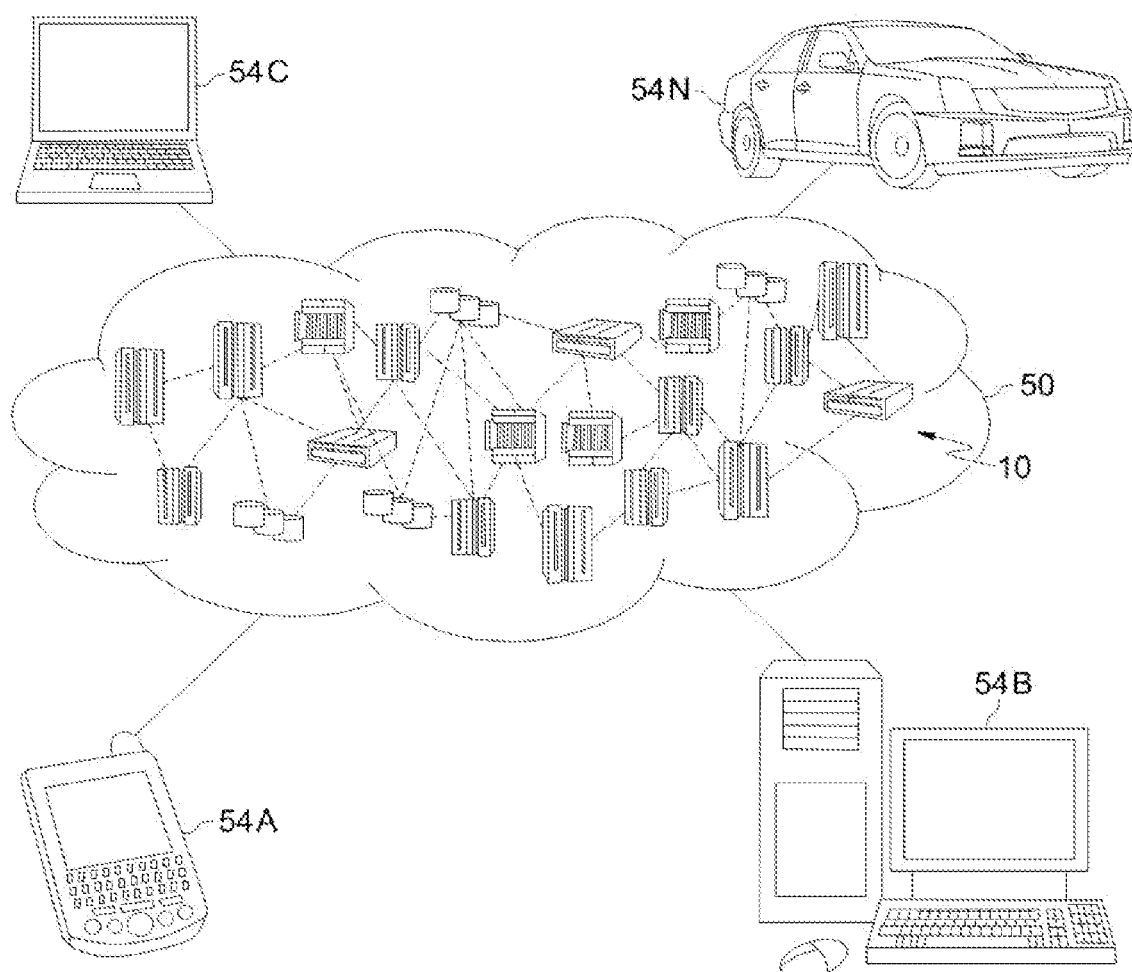
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
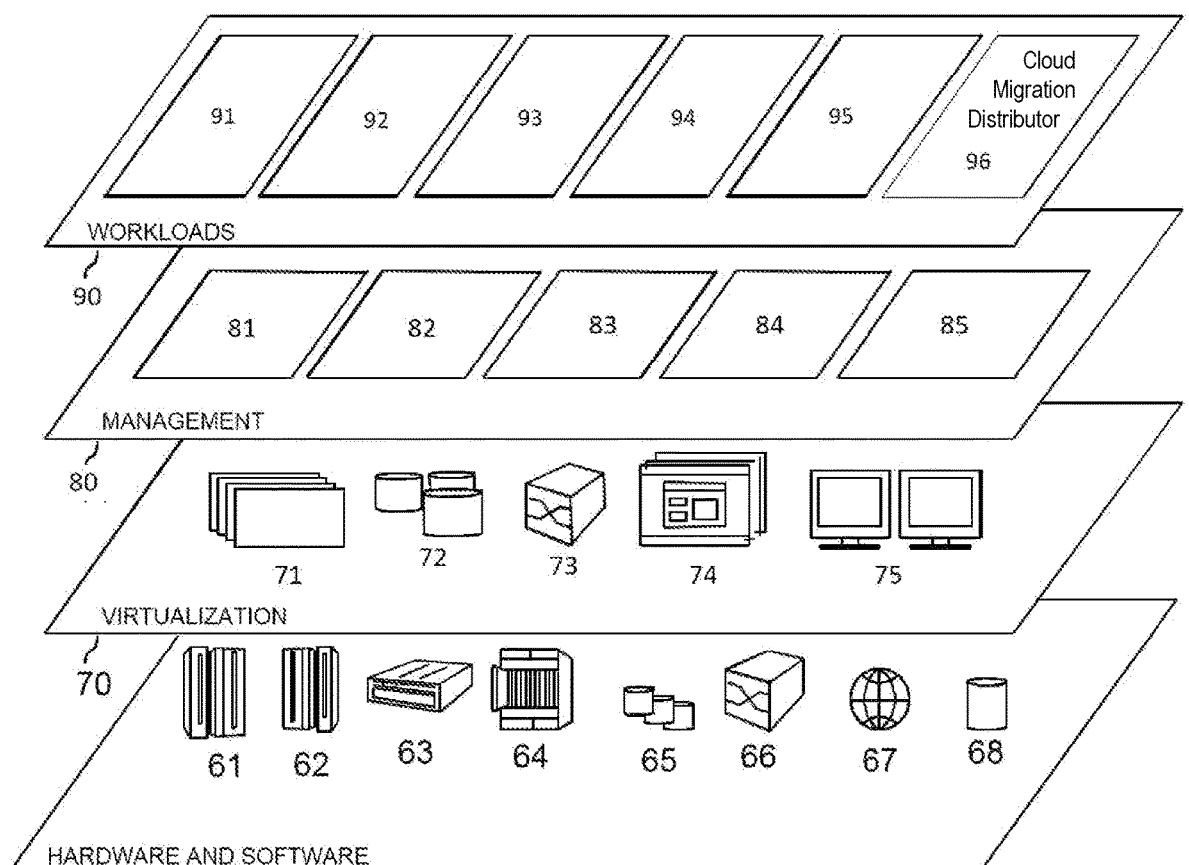
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below.

Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cloud migration distributor 96.

Implementations of the invention may include a computer system/server 12 of FIG. 1 in which one or more of the program modules 42 are configured to perform (or cause the computer system/server 12 to perform) one of more functions of the cloud migration distributor 96 of FIG. 3. For example, the one or more of the program modules 42 may be configured to: a) define a network of nodes of migration practitioners; b) receive working sets from the nodes defining ownership of data servers; c) determine a consensus of ownership of the data servers amongst the migration practitioners; d) update the working sets using the consensus of ownership; f) distribute the updated working sets across the nodes; g) obtain activity wrappers of migration activities on the data servers within the distributed working sets; h) generate migration activities based on the obtained activity wrappers; i) determine connectivity problems in the network; j) resolve the connectivity problems in the network; l) allow a new node to join the network; and m) assign ownership of unowned data servers to the new node.

Figure 4:
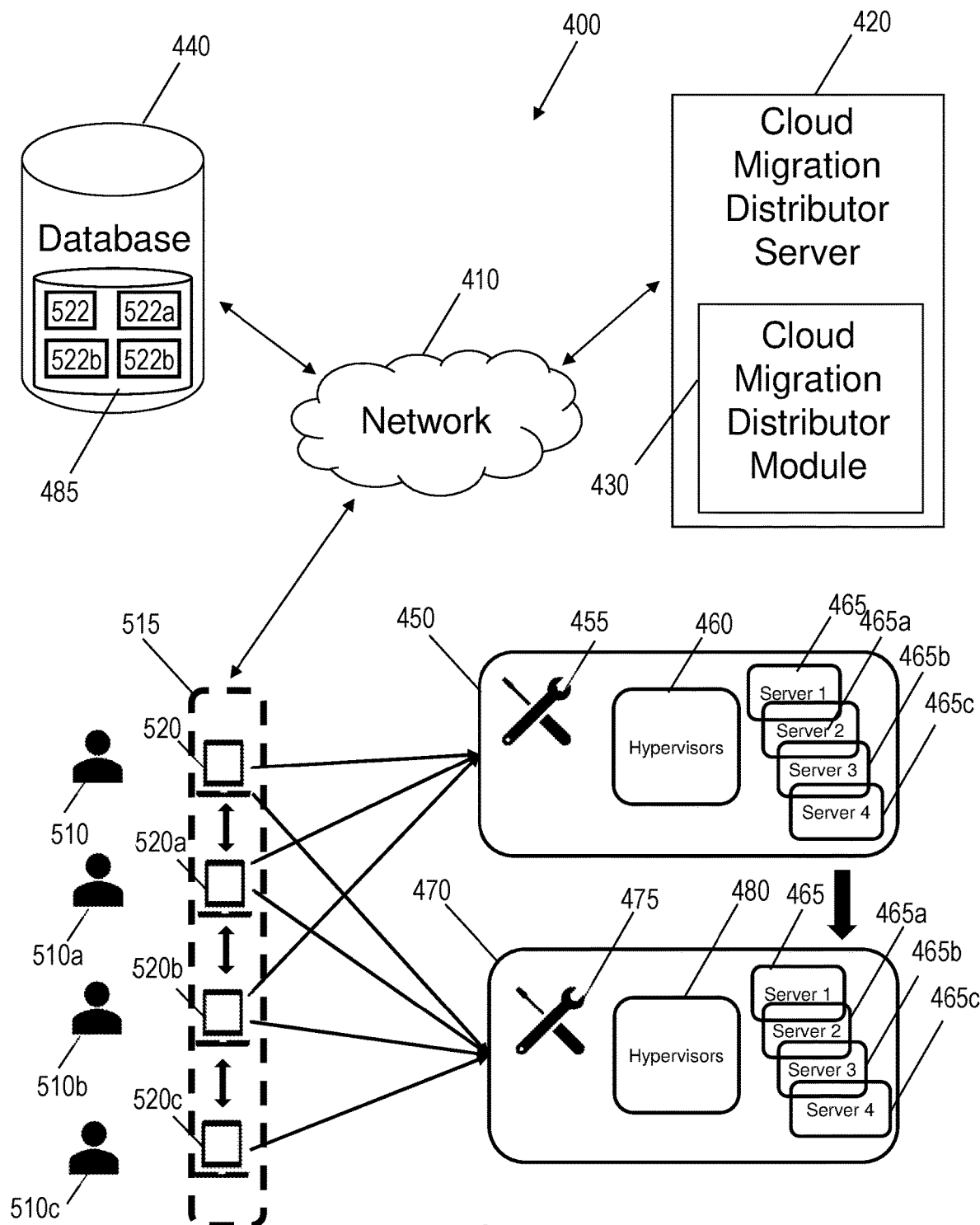
FIG. 4 shows a block diagram of an exemplary environment in accordance with aspects of the invention.

FIG. 4 shows a block diagram of an exemplary environment in accordance with aspects of the invention. In embodiments, the environment 400 includes a network 410, a cloud migration distributor server 420, a database 440, and a plurality of nodes 520, 520a, 520b, 520c in a network 515. In embodiments, the nodes 520, 520a, 520b, 520c are computing devices of migration practitioners 510, 510a, 510b, 510c. Examples of the migration practitioners 510, 510a, 510b, 510c include a data engineer, a data architect, a programmer, or other data professional, amongst other examples. Examples of the nodes 520, 520a, 520b, 520c include a desktop computer, a laptop computer, a tablet, a smartphone, amongst other examples. In further embodiments, the nodes 520, 520a, 520b, 520c are running distributed databases on an Internet hosting site to interact with one another. In embodiments, the nodes 520, 520a, 520b, 520c assist in the migration of data servers 465, 465a, 465b, 465c, referred to as endpoints, from a source location 450 to a target location 470. In embodiments, the number of data servers for migration are any number. In embodiments, the source location 450 and the target location 470 are a cloud environment or a datacenter, amongst other examples. In embodiments, the source location 450 includes tools 455 for migrating the servers 465, 465a, 465b, 465c from the source location 450 to the target location 470, along with hypervisors 460 which allow the tools 455 to operate within the source location 450. In further embodiments, the target location 470 includes tools 475 for migrating the servers 465, 465a, 465b, 465c from the source location 450 to the target location 470, along with hypervisors 480 which allows the tools 475 to operate within the target location 470. In embodiments, the source location 450 includes logs 462 and the target location 470 includes logs 482, with the logs recording data migration information. In embodiments, the database 440 includes a repository 485 which contains node metadata 522, 522a, 522b, 522c of the nodes 520, 520a, 520b, 520c.

In embodiments, the cloud migration distributor server 420 comprises a cloud migration distributor module 430, which comprises one or more program modules such as program modules 42 described with respect to FIG. 1. In embodiments, the cloud migration distributor module 430 includes a working set consensus module, an endpoint state constructor module, a discovery & network manager module, a process & activity generator module, a distributed probe executor module, a heartbeat checker module, and a master node manager module. The cloud migration distributor server 420 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment 400 is not limited to what is shown in FIG. 4. In practice, the environment 400 may include additional devices and/or networks; fewer devices and/or networks; different devices and/or networks; or differently arranged devices and/or networks than illustrated in FIG. 4.

In embodiments, the network 410 is any suitable network including any combination of one or more of a LAN, WAN, or the Internet. In a particular embodiment, the network 410 is representative of a cloud computing environment 50 as described in FIG. 2.

Conducting a cloud migration of data servers over a peer to peer (p2p) network, i.e., two or more computing devices which have equal power and privileges on the network, poses unique challenges. In embodiments, to migrate the data servers 465, 465a, 465b, 465c from the source location 450 to the target location 470, a first migration approach includes a plurality of migration practitioners 510, 510a, 510b, 510c using the nodes 520, 520a, 520b, 520c to directly access the tools 455 to migrate the data servers 465, 465a, 465b, 465c from the source location 450 to the target location 470. However, this first approach may result in a relatively longer migration process because this first approach incorporates a plurality of steps, which include: checking a state of the tools; and extracting configuration information of the data servers 465, 465a, 465b, 465c in order to select a tool of the tools 455 which corresponds to a configuration from the configuration information. In embodiments, the migration approach continues the migration process until a cutover, or a failover occurs. In embodiments, a cutover occurs when all the data servers 465, 465a, 465b, 465c are now present in the target location 470. In further embodiments, a failover occurs when the migration of the data servers 465, 465a, 465b, 465c stops without all the data servers 465, 465a, 465b, 465c being present in the target location 470. In embodiments, each of these steps include sub-steps, with each sub-set being implementable as microservices if there is an intermediate application. In embodiments, the microservices are executable from any node of the nodes 520, 520a, 520b, 520c as long as the microservice is available on the node of the nodes 520, 520a, 520b, 520c and input parameters to operate the microservice is available on the node of the nodes 520, 520a, 520b, 520c. Another issue which arises with the first approach is that more than one practitioner of the practitioners 510, 510a, 510b may be migrating the same data server of the data servers 465, 465a, 465b, 465c, which wastes computing resources since more than one node of the nodes 520, 520a, 520b, 520c is working to migrate the same data server of the data servers 465, 465a, 465b, 465c. Further issues with the first approach include is that a workload discovery activity requires connectivity to source data center, a workload sync activity requires a relatively strong network bandwidth, and a compilation of server configuration comparison report pre & post migration demands a relatively high CPU.

In embodiments, a second approach to migrating the data servers 465, 465a, 465b, 465c from the source location 450 to the target location 470 includes the migration practitioners using an intermediate centralized application which automates many of the actions for migrating the data servers 465, 465a, 465b, 465c from the source location 450 to the target location 470. While this second approach may result in a relatively shorter down time in comparison to the first approach, this second approach is relatively costlier since the intermediate centralized application may use more computing resources. Accordingly, conducting a cloud migration process over a peer to peer (p2p) network, e.g., nodes 520, 520a, 520b, 520c poses unique challenges.

FIGS. 5A-5F illustrate a consensus of ownership amongst migration practitioners 510, 510a, 510b, in accordance with aspects of the invention. FIGS. 5A-5F are described with reference to elements depicted in FIG. 4. In embodiments, the migration distributor module 430 of FIG. 4 resolves any disputes regarding ownership of the data servers 465, 465a, 465b, 465c by determining a consensus of ownership of the data servers 465, 465a, 465b, 465c amongst the migration practitioners 510, 510a, 510b, 510c.

Figure 5A:
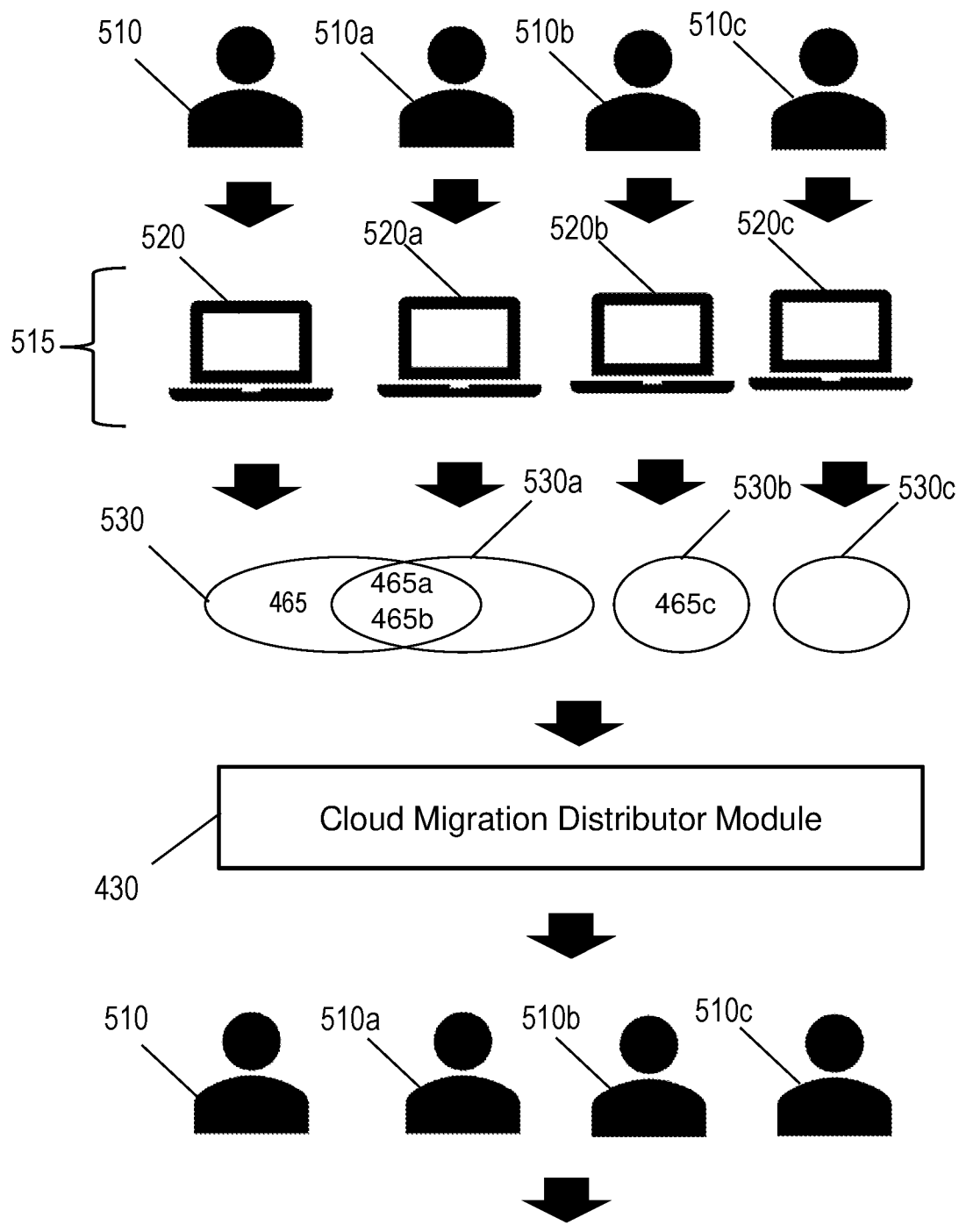

Referring to FIG. 5A, in embodiments the cloud migration distributor module 430 defines the network 515 of nodes 520, 520a, 520b, 520c of migration practitioners 510, 510a, 510b, 510c for the migration of the data servers 465, 465a, 465b, 465c. In embodiments, in response to the nodes starting to migrate the data servers 465, 465a, 465b, 465c, the cloud migration distributor module 430 identifies node metadata 522, 522a, 522b, 522c of each node of the nodes 520, 520a, 520b, 520c, and saves this node metadata 522, 522a, 522b, 522c to the repository 485 of the database 440 to determine the network 515. In embodiments, the cloud migration distributor module 430 identifies node metadata including an Internet Protocol address (IP address) of each node, amongst other node metadata, e.g., a media access control (MAC) address of each node and node setup connections. In embodiments, a file name of the node metadata is based on a host name, e.g., "node metadata of node 520."

In embodiments, the cloud migration distributor module 430 defines the network 515 of the nodes 520, 520a, 520b, 520c using the node metadata in the repository 485. Specifically, the cloud migration distributor module 430 defines the network 515 as nodes 520, 520a, 520b, 520c which have node metadata 522, 522a, 522b, 522c in the repository 485. By belonging to the network 515, the nodes 520, 520a, 520b, 520c are each able to access the repository 485 and communicate with one another. In embodiments, each node of the nodes 520, 520*a*, 520*b*, 520*c* updates their node metadata at a specific amount of time (T). As an example, a node updates its node metadata after an amount of time of 30 seconds by adding the node's latest IP address to the node metadata. In embodiments, updating the node metadata includes the nodes indicating they still have a connection to the network 515 by adding a line in its respective node metadata that signifies that that this node still has a connection to the network 515. In embodiments, if a node of the nodes 520, 520*a*, 520*b*, 520*c* is the only node to begin migrating a data server of the data servers 465, 465*a*, 465*b*, 465*c*, then this node becomes a leader node in the network 515. In embodiments, a leader node fetches the node metadata files on a periodic manner. In further embodiments, the leader node asks another node in the network 515 to update its respective node metadata in the repository 485. In embodiments, the leader node sets the specific amount of time (T) at a beginning of the migration of the data servers 465, 465*a*, 465*b*, 465*c*. In further embodiments, on a periodic basis, each node within the network 515 sends a heartbeat to the other nodes to confirm to the other nodes that this node is alive. Examples of heartbeats include a message. In embodiments, if a node does not send a heartbeat at a certain time period (H), then the other nodes consider this node to be down.

In embodiments, the cloud migration distributor module 430 removes node metadata from the repository in response to determining that a node of the nodes 520, 520*a*, 520*b*, 520*c* no longer has a connection to the network 515. In embodiments, the cloud migration distributor module 430 determines that a node no longer has a connection to the network 515 after a fixed number of failed connectivity attempts by the cloud migration distributor module 430 to the node, and/or after a time period expires in which the node metadata of that node is older than the time period. In further embodiments, the cloud migration distributor module 430 determines that a node is longer in connection with the network 515 by accessing the respective node metadata and looking for the line indicating that the node is still in connection with the network. In embodiments, if this line is not present in the node metadata, then the cloud migration distributor module 430 determines that this node no longer has a connection to the network 515. In embodiments, if a migration practitioner of the migration practitioners 510, 510*a*, 510*b*, 510*c* knows they are exiting the network 515, the migration practitioner through their node deletes the respective node metadata from the repository 485.

Continuing with FIG. 5A, in response to determining the network 515 of the nodes 520, 520*a*, 520*b*, 520*c*, the cloud migration distributor module 430 receives the working sets 530, 530*a*, 530*b*, 530*c* from the nodes 520, 520*a*, 520*b*, 520*c* through the network 410. In embodiments, during a cloud migration process, each migration practitioner of the migration practitioners 510, 510*a*, 510*b*, 510*c* migrates at least one data server of the data servers 465, 465*a*, 465*b*, 465*c*. In this way, each working set of the working sets 530, 530*a*, 530*b*, 530*c* defines at least one data server of the data servers 465, 465*a*, 465*b*, 465*c* in which a migration practitioner of the migration practitioners 510, 510*a*, 510*b*, 510*c* is currently migrating, i.e., working on.

In embodiments, the cloud migration distributor module 430 determines whether any disputes exist regarding ownership of the data servers 465, 465*a*, 465*b*, 465*c* by using the working sets 530, 530*a*, 530*b*, 530*c*. In embodiments, a dispute is when two or more working sets of the working sets 530, 530*a*, 530*b*, 530*c* define a same data server of the data servers 465, 465*a*, 465*b*, 465*c*. In this way, a dispute is with respect to ownership of a data server. Defining a same data server in two or more working sets of the working sets 530, 530*a*, 530*b*, 530*c* indicates that more than one migration practitioner is migrating that data server. Having more than one migration practitioner migrate the same data server is unnecessary, since two or more migration practitioners are repeating the same migration actions for the same data server. As an example, the cloud migration distributor module 430 determines that the working sets 530, 530*a* both define ownership over the data servers 465*a*, 465*b* by the migration practitioners 510, 510*a*. Accordingly, using the definitions from the working sets 530, 530*a*, the cloud migration distributor module 430 determines that a dispute exists over ownership of the data servers 465*a*, 465*b*, i.e., a dispute exists over which migration practitioner should migrate the data server in question. In this way, the cloud migration distributor module 430 determines whether disputes exist between the migration practitioners 510, 510*a*, 510*b*, 510*c* by using the definitions in the working sets 530, 530*a*, 530*b*, 530*c*. In further embodiments, if a working set of the working sets 530, 530*a*, 530*b*, 530*c* defines a data server which is not in dispute, then the cloud migration distributor module 430 determines that ownership belongs to the respective migration practitioner of that working set.

In embodiments, in response to the cloud migration distributor module 430 determining a dispute exists regarding ownership of the data servers 465, 465*a*, 465*b*, 465*c*, the cloud migration distributor module 430 notifies the two or more disputing migration practitioners of the migration practitioners 510, 510*a*, 510*b*, 510*c* that a dispute exists regarding their working sets 530, 530*a*. As an example, the cloud migration distributor module 430 notifies the migration practitioners 510, 510*a* that a dispute exists regarding the data servers 465*a*, 465*b*, since both of the migration practitioners 510, 510*a* sent working sets 530, 530*a* to the cloud migration distributor module 430 which both define the data servers 465*a*, 465*b*. In embodiments, the cloud migration distributor module 430 notifies the two or more migration practitioners of the dispute by sending a notification message for display on their respective node of the nodes 520, 520*a*, 520*b*, 520*c*. In embodiments, the notification message includes which data servers of the data servers 465, 465*a*, 465*b*, 465*c* are in dispute and which migration practitioners of the migration practitioners 510, 510*a*, 510*b*, 510*c* are in dispute over ownership of the data servers in question.

Figure 5B:
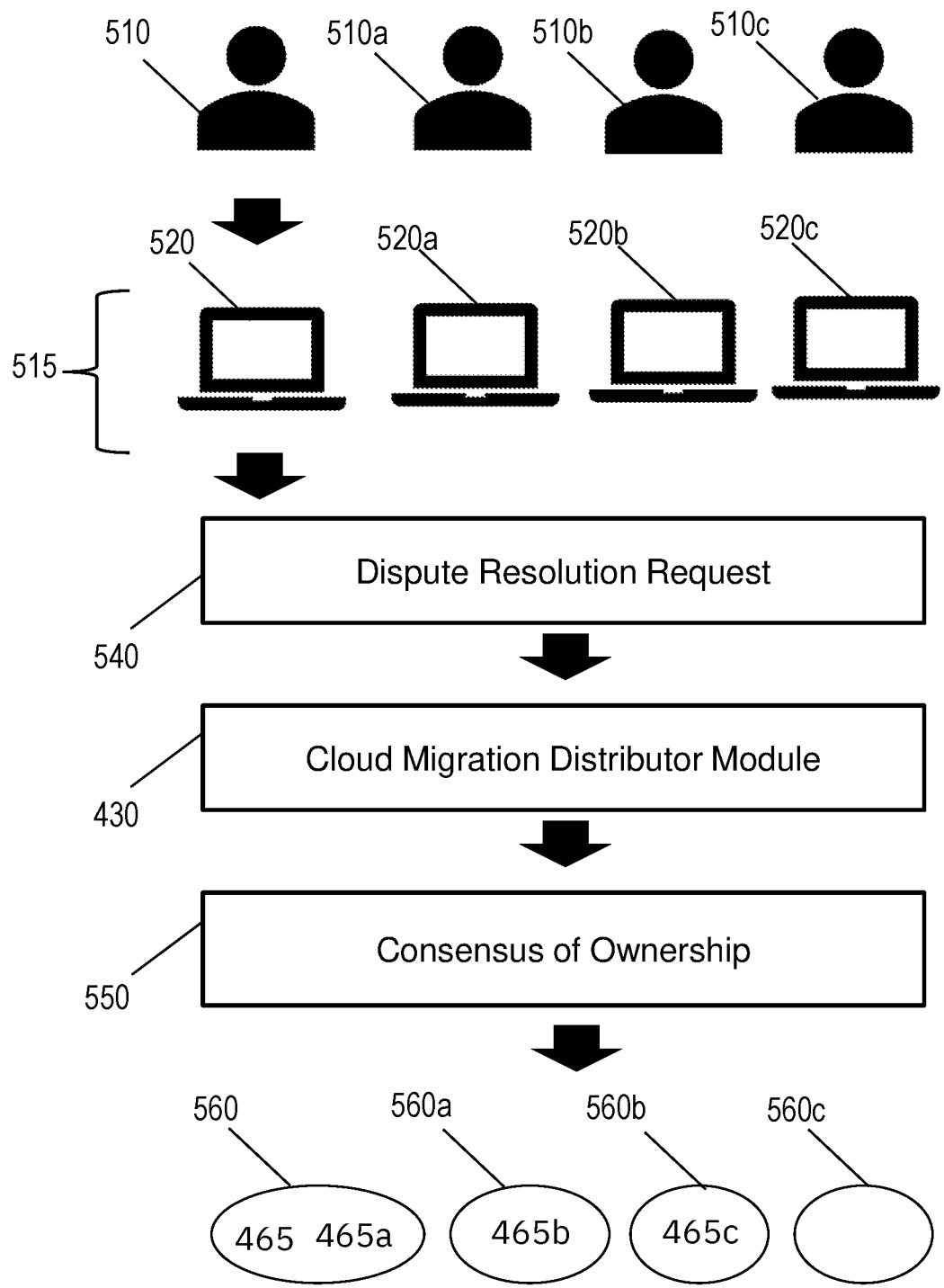

Referring FIG. 5B, in embodiments the cloud migration distributor module 430 receives a dispute resolution request 540 from a migration practitioner of the migration practitioners 510, 510*a*, 510*b*, 510*c* to resolve ownership of the data servers 465, 465*a*, 465*b*, 465*c*. In embodiments, a migration practitioner of the migration practitioners 510, 510*a*, 510*b*, 510*c* initiates the dispute resolution request 540 in response to notification of the dispute. As an example, the migration practitioner 510, known as an initiator, initiates the dispute resolution request 540 in response to receiving the notification message from the cloud migration distributor module 430 that another migration practitioner of the migration practitioners 510, 510*a*, 510*b*, 510*c* has a working set defining the data servers 465*a*, 465*b*. In embodiments, the cloud migration distributor module 430 receives the dispute resolution request 540 from the migration practitioner 510 through the network 410.

Referring to FIG. 5C, in embodiments the dispute resolution request 540 includes information indicating which data servers of the data servers 465, 465*a*, 465*b*, 465*c* the migration practitioner of the migration practitioners 510, 510a, 510b, 510c is requesting ownership of. As an example, the dispute resolution request 540 incudes the information that the migration practitioner 510 is requesting ownership over the data server 465a, as shown in FIG. 5C. In further embodiments, the dispute resolution request 540 includes a reasoning why the migration practitioner 510 deserves ownership of the at least one data server which is in dispute.

In embodiments, in response to the cloud migration distributor module 430 receiving the dispute resolution request 540 from the migration practitioner 510, the cloud migration distributor module 430 resolves the dispute by determining a consensus of ownership 550 (shown in FIG. 5B) amongst the remaining migration practitioners 510a, 510b, 510c. In embodiments, the cloud migration distributor module 430 determines the consensus of ownership 550 by polling the remaining migration practitioners 510a, 510b, 510c. In embodiments, the cloud migration distributor module 430 polls the remaining practitioners 510a, 510b, 510c by sending polling messages for display on the nodes 520a, 520b, 520c. In embodiments, each polling message includes a key, e.g., "/Data Server/465a/Owner/Practitioner/510," which identifies an ownership request by the disputing migration practitioner 510 for the data server 465a. In embodiments, the polling messages request whether a practitioner of the remaining migration practitioners 510a, 510b, 510c agrees or disagrees with the ownership request of the disputing migration practitioner 510 regarding ownership of the data server 465a.

In embodiments, in response to the receiving the polling messages, the remaining migration practitioners 510a, 510b, 510c each read the key and determine whether they agree with the ownership request of the disputing migration practitioner 510. In embodiments, to make an ownership determination, a migration practitioner of the remaining migration practitioners 510a, 510b, 510c consults a policy, if a policy is available. For example, a policy include information of "Owner(EndpointId 465b, PratitionerId 510b)=true," which indicates that the migration practitioner 510b owns the data server 465b. In this example, the policy does not indicate that the migration practitioner 510b owns the data server 465a, which is the data server the migration practitioner 510 is requesting ownership of. In this example, the migration practitioner 510b agrees that the migration practitioner 510 should receive ownership over the data server 465a, since the policy does not indicate ownership over the data server 465a. In embodiments, a migration practitioner of the remaining migration practitioners 510a, 510b, 510c responds to the polling message by creating a new variable, which indicates whether they "agree" or "disagree" with the ownership request.

In embodiments, if no policy is available, then a node of the remaining nodes 520a, 520b, 520c of the remaining migration practitioners 510a, 510b, 510c alerts its respective migration practitioner about the dispute resolution request 540, and further checks against a definition of the working set of their respective migration practitioner. In this embodiment, if the working set does not clash with the ownership request of the migration practitioner 510, i.e., the definition of the working set does not define as owning the same data server which the migration practitioner 510 is requesting ownership of, then the node of the migration practitioner automatically responds to the cloud migration distributor module 430 with an "agree" response. Alternatively, if the working set does clash with the ownership request of the migration practitioner 510, then the node of the migration practitioner automatically responds to the cloud migration distributor module 430 with a "disagree" response. In further embodiments, the migration practitioner 510 polls the remaining migration practitioners 510a, 510b, 510c directly regarding the dispute resolution request after a predefined interval of time T after the migration practitioner 510 submits the dispute resolution request 540 to the cloud migration distributor module 430.

Referring to FIGS. 5D-5F, in response to the polling, in embodiments the cloud migration distributor module 430 receives polling responses 545a, 545b, 545c, from the remaining migration practitioners 510a, 510b, 510c. In embodiments, each polling response of the polling responses 545a, 545b, 545c include a determination from a migration practitioner of the remaining migration practitioners 510a, 510b, 510c regarding the ownership request of the disputing migration practitioner 510. In this way, the cloud migration distributor module 430 receives polling responses from the remaining migration practitioners 510a, 510b, 510c in response to the dispute resolution request 540. As an example, the polling response 545a indicates that the migration practitioner 510a disagrees with the request for ownership of the data server 465a by the disputing migration practitioner 510. As another example, the polling response 545b indicates that practitioner 510b agrees with the request for ownership of the data server 465a by the disputing migration practitioner 510. As a further example, the polling response 545c indicates that practitioner 510c agrees with the request for ownership of the data server 465a by the disputing migration practitioner 510.

In embodiments, the cloud migration distributor module 430 resolves the dispute to determine a consensus of ownership for a data server of the data servers 465, 465a, 465b, 465c using the polling responses 545, 545a, 545b. Specifically, the cloud migration distributor module 430 counts a number of agrees and disagrees in the polling responses 545, 545a, 545b in response to the ownership request. In embodiments, if a majority of the migration practitioners of the remaining migration practitioners 510a, 510b, 510c "agree" that the disputing migration practitioner 510 should own the data server 465a, then the cloud migration distributor module 430 determines that the consensus is that migration practitioner 510 should own the data server 465a. In this way, if a majority of the polling responses 545, 545a, 545b agree with the ownership request of the dispute resolution request 540, then the cloud migration distributor module 430 determines that the consensus of ownership is that the disputing migration practitioner 510 should own the data server in dispute. Alternatively, if a majority of the migration practitioners of the remaining migration practitioners 510a, 510b, 510c "disagree" that migration practitioner 510 should own the data server 465a, then the cloud migration distributor module 430 determines that the migration practitioner 510 does not have consensus of ownership to own the data server 465a. In this way, the cloud migration distributor module 430 provides a node-consensus to execute migration actions. In embodiments, the cloud migration distributor module 430 sends a consensus message to the migration practitioners 510, 510a, 510b, 510c regarding the consensus of ownership. As an example, the cloud migration distributor module 430 sends a message of "Ownership Granted" to the nodes 520, 520a, 520b, 520c for display to the migration practitioners 510, 510a, 510b, 510c.

In embodiments, if a data server of the data servers 465, 465a, 465b, 465c is not in a definition of a working set of the working sets 530, 530a, 530b, 530c, i.e., the migration practitioners 510, 510a, 510b, 510c are not migrating the data server, then the cloud migration distributor module 430 initiates a dispute resolution to determine a consensus of ownership for this data server not in a working set. As an example, if the data server 465c is not in any definition of the working sets 530, 530a, 530b, 530c, then the cloud migration distributor module 430 initiates a dispute resolution to determine a consensus of ownership of the data server 465c. As a further example, the cloud migration distributor module 430 sends polling messages to the migration practitioners 510, 510a, 510b, 510c asking if they want ownership over the data server 465c. In response to receiving a response from the migration practitioner 510b agreeing to ownership of the data server 465c, the cloud migration distributor module 430 updates the working set 530b to include the data server 465 in view of ownership by migration practitioner 510b. In further embodiments, if none of the migration practitioners 510, 510a, 510b, 510c agrees to ownership, then the cloud migration distributor module 430 assigns ownership to a new practitioner in response to the new practitioner joining the migration practitioners 510, 510a, 510b, 510c in the migration of the data servers 465, 465a, 465b, 465c.

In embodiments, in response to the consensus of ownership, the cloud migration distributor module 430 updates the working sets 530, 530a, 530b, 530c to reflect the consensus of ownership. In this way, the cloud migration distributor module 430 ensures that no migration practitioner encroaches on the migration activities of another migration practitioner by determining a consensus of ownership of a data server and updating the working sets 530, 530a, 530b, 530c to reflect the consensus of ownership. In embodiments, the cloud migration distributor module 430 updates the working sets 530, 530a, 530b, 530c by generating the updated working sets 560, 560a, 560b, 560c (shown in FIG. 5B). In embodiments, each updated working set of the updated working sets 560, 560a, 560b, 560c indicates an ownership of at least one data server of the data servers 465, 465a, 465b, 465c by a migration practitioner of the migration practitioners 510, 510a, 510b, 510c, in view of the consensus of ownership amongst the migration practitioners 510, 510a, 510b, 510c. In this way, the updated working sets 560, 560a, 560b, 560c represent a boundary of what the migration practitioners 510, 510a, 510b, 510c is controlling during the migration process. In embodiments, the cloud migration distributor module 430 sends the updated working sets 560, 560a, 560b, 560c through the network 410 for display on the nodes 520, 520a, 520b, 520c of the migration practitioners 510, 510a, 510b, 510c. In this way, the cloud migration distributor module 430 refreshes a state of each node of the nodes 520, 520a, 520b, 520c to reflect the consensus of ownership.

Figure 6A:
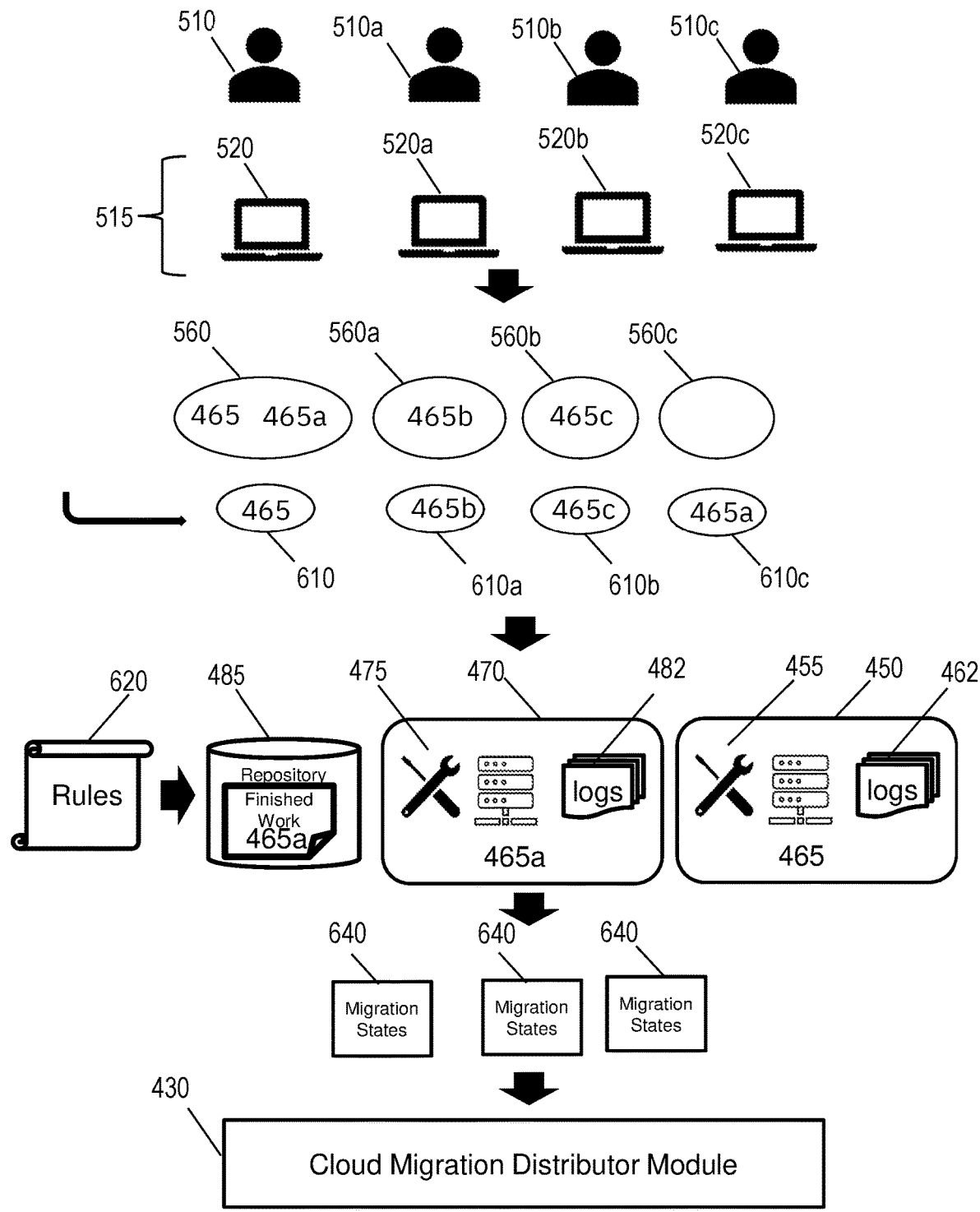
FIGS. 6A and 6B show a determination of migration states of the cloud migration process in accordance with aspects of the invention.
Figure 6B:
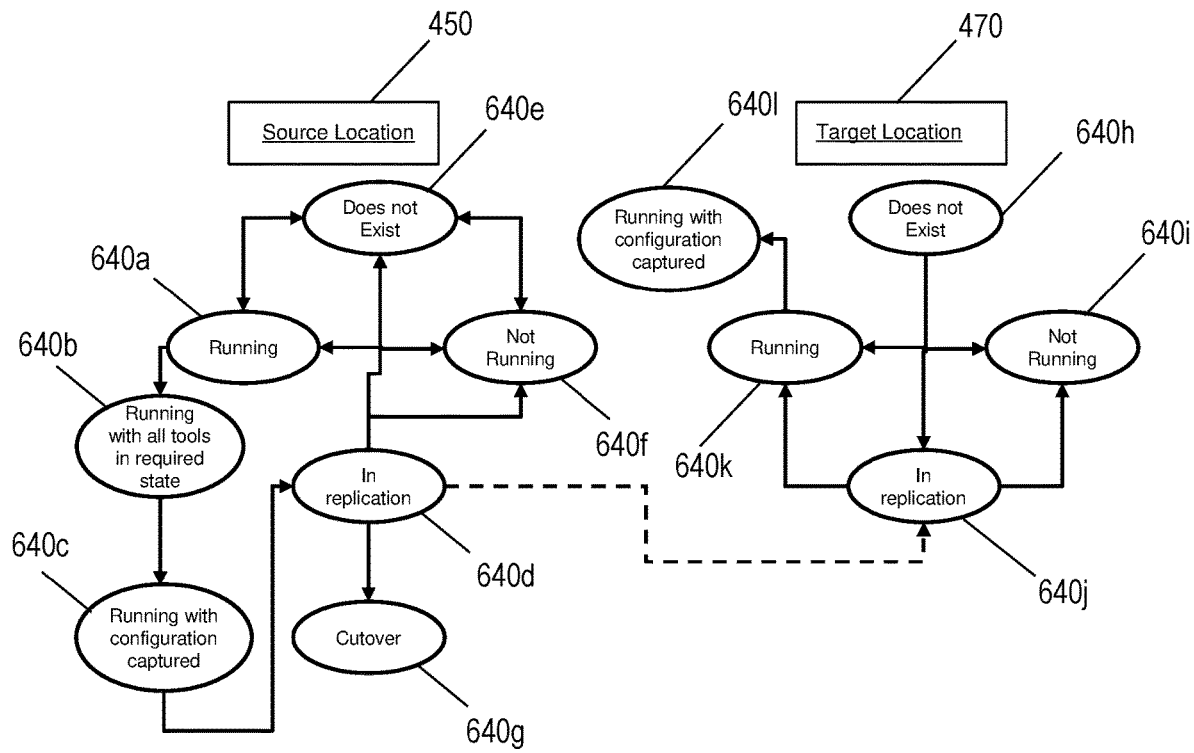

FIGS. 6A and 6B illustrate a construction of migration states 640 in accordance with aspects of the invention. FIGS. 6A and 6B are described with reference to elements depicted in FIGS. 4 and 5A-5F.

In embodiments, the cloud migration distributor module 430 constructs the migration states 640 by distributing the updated working sets 560, 560a, 560b, 560c across the nodes 520, 520a, 520b, 520c to create the distributed working sets 610, 610a, 610b, 610c. In embodiments, the cloud migration distributor module 430 distributes the updated working sets 560, 560a, 560b, 560c by generating the distributed working sets 610, 610a, 610b, 610c based on several factors. A first factor is node availability of the nodes 520, 520a, 520b, 520c. As an example, the cloud migration distributor module 430 uses the definition within the updated working set 560c to determine that the migration practitioner 510c and their node 520c are not working on any of the data servers 465, 465a, 465b, 465c. In view of the node availability of the node 520c, the cloud migration distributor module 430 distributes the data server 465a to the distributed working set 610 from the updated working set 560.

In embodiments, the cloud migration distributor module 430 creates the distributed working sets 610, 610a, 610b, 610c based on a second factor of a computing capacity of the nodes 520, 520a, 520b, 520c, in addition to the first factor or instead of the first factor. As example, the cloud migration distributor module 430 polls the nodes 520, 520a, 520b, 520c to determine an amount of memory available at each node of the nodes 520, 520a, 520b, 520c. In response to determining the amount of memory available at each node, the cloud migration distributor module 430 distributes the data server 465a from the working set 560 to the distributed working set 610c based on node 520c having more memory available than the node 520.

In embodiments, the cloud migration distributor module 430 creates the distributed working sets 610, 610a, 610b, 610c based on a third factor of network connectivity of the nodes 520, 520a, 520b, 520c in addition to any combination of the first factor and/or the second factor and/or instead of the first factor and second factor. In embodiments, the cloud migration distributor module 430 determines connectivity based on receiving a heartbeat confirmation, i.e., a message, from each node of the nodes 520, 520a, 520b, 520c. As an example, the cloud migration distributor module 430 determines that node 520a is still in connection with the network of other nodes 520, 520b, 520c in response to receiving the heartbeat confirmation from the node 520a. Alternatively, if the cloud migration distributor module 430 does not receive a heartbeat confirmation from the node 520a, the cloud migration distributor module 430 determines that node 520a has lost the connection with the cloud migration distributor module 430 and the other nodes 520, 520b, 520c. In response to determining a loss in network connectivity for the node 520a, the cloud migration distributor module 430 distributes the data server 465b from the working set 560a to another distributed working set of the distributed working sets 610, 610a, 610b, 610c. In this way, the creating the distributed working sets 610, 610a, 610b, 610c is based on a single factor or a combination of factors.

In embodiments, following the creation of the distributed working sets 610, 610a, 610b, 610c, the cloud migration distributor module 430 sends the distributed working sets 610, 610a, 610b, 610c to the nodes 520, 520a, 520b, 520c for the migration practitioners 510, 510a, 510b, 510c to migrate the data servers 465, 465a, 465b, 465c. In this way, the cloud migration distributor module 430 distributes migration activities of migration processes in an environment based on currently available capabilities of platform components, i.e., nodes 520, 520a, 520b, 520c.

In embodiments, following the creation of the distributed working sets 610, 610a, 610b, 610c, the cloud migration distributor module 430 receives the migration states 640 for each data server of the data servers 465, 465a, 465b, 465c. In embodiments, the migration of data servers 465, 465a, 465b, 465 includes several migration stages during the migration process, with a data server being in a specific state at each stage. Specifically, the data servers 465, 465a, 465b, 465c undergo various source migration states 640a-640g (shown in FIG. 6B) at the source location 450, and also undergoes target migration states 640h-640l at the target location 470. Examples of the source migration states 640a-640g include: a) state 630a which includes a data server running in the source location 450; b) state 630b which includes a data server running with all the tools in their required states; c) state 630*c* which includes a data server running with a configuration of the data server captured; d) state 630*d* which includes a data server replicating over to the target location 470; e) state 630*e* which includes a data server not existing in the source location 450 since the data server now exists in the target location 470; f) state 630*f* which includes the data server not running since the data server no longer exists in the source location 450; and g) state 630*g* which includes a cutover in which migration of the data server is complete and the migration process stops. Examples of the target migration states 640*h*-640*l* include: a) state 640*h* which includes the data server not existing since the data server still exists over in the source location 450; b) state 640*i* which includes the data server not running because data server does not exist in the target location 470 yet; c) state 640*j* which includes the data server replicating over to the target location 470 from the source location 450; d) state 640*k* which includes a data server running in the target location 470; and e) state 640*l* which includes a data server running with a configuration of the data server captured.

In embodiments, the cloud migration distributor module 430 receives the migration states 640 from the migration practitioners 510, 510*a*, 510*b*, 510*c* by the nodes 520, 520*a*, 520*b*, 520*c* (as shown in FIG. 6A). In embodiments, each migration practitioner through their respective node accesses the tools 455, 475 and the data servers within their respective distributed working sets of the distributed working sets 610, 610*a*, 610*b*, 610*c* to construct the migration states 640. Specifically, each migration practitioner runs a microservice on their node to access the tools 455, 475 and the data servers 465, 465*a*, 465*b*, 465*c*. In embodiments, in view of data background of the migration practitioners 510, 510*a*, 510*b*, 510*c*, they know the migration states 640 of the data servers 465, 465*a*, 465*b*, 465*c* from the configuration of the tools 455, 475. Further, the migration practitioners 510, 510*a*, 510*b*, 510*c* know the rules for which migration states 640 occur next in the data migration process. In this way, the migration practitioners 510, 510*a*, 510*b*, 510*c* use the information in the tools 455, 475 to classify each data server into one of the migration states 640*a*-640*l* shown in FIG. 6B, and then construct a next migration state by knowing the rules of data migration. In this way, the migration practitioners 510, 510*a*, 510*b*, 510*c* know which migration activities to perform next. For example, the data server 465*a* is in the running migration state 640*a* in the source location 450. In view of this migration state 640*a*, the migration practitioner 510 knows from their cloud migration knowledge that migration rules indicate the next migration activity is to place the data server 465*a* into the running with all tools in required state of migration state 640*b*.

Figure 7A:
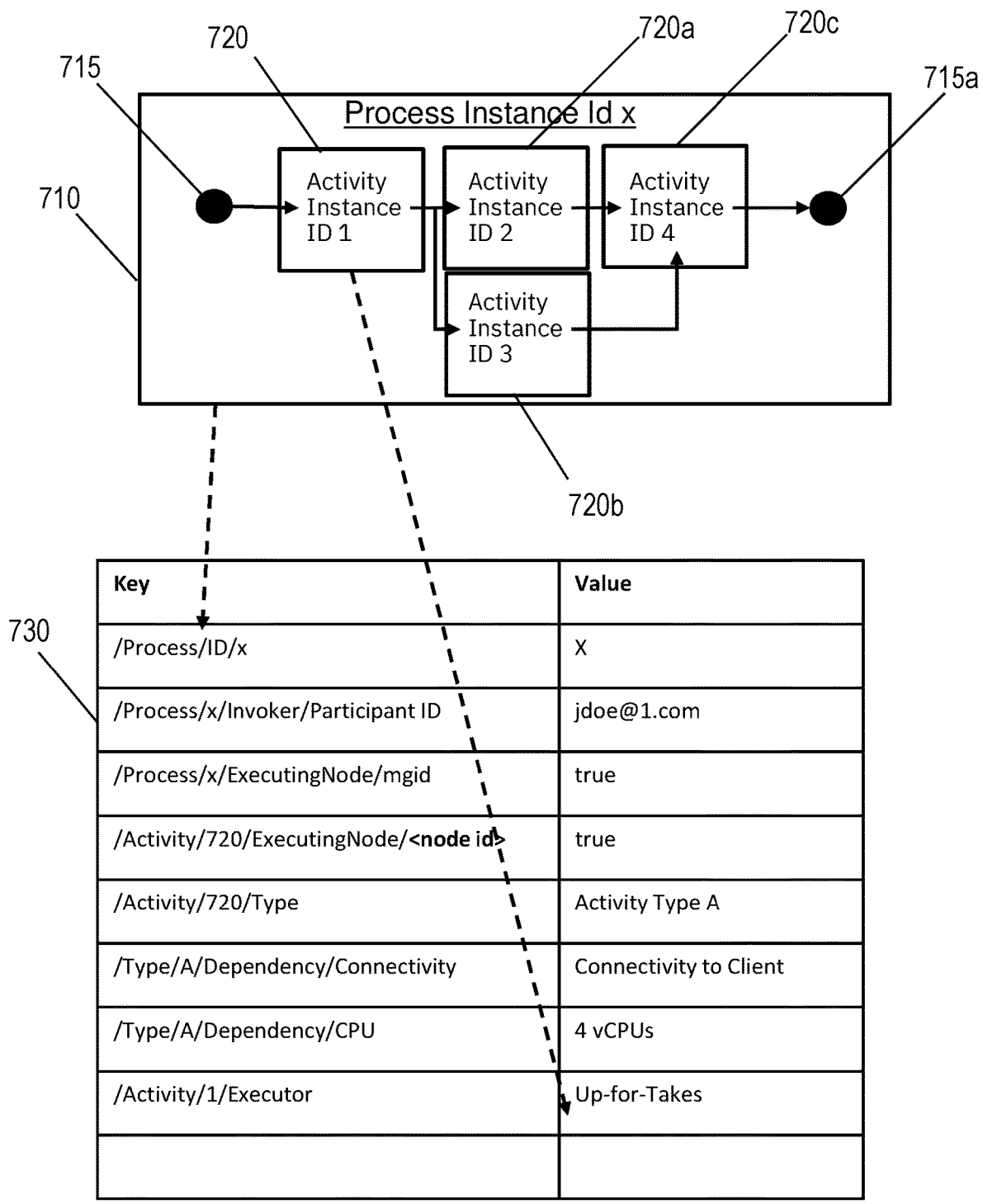
FIGS. 7A and 7B show an activity generation during a cloud migration process in accordance with aspects of the invention.
Figure 7B:
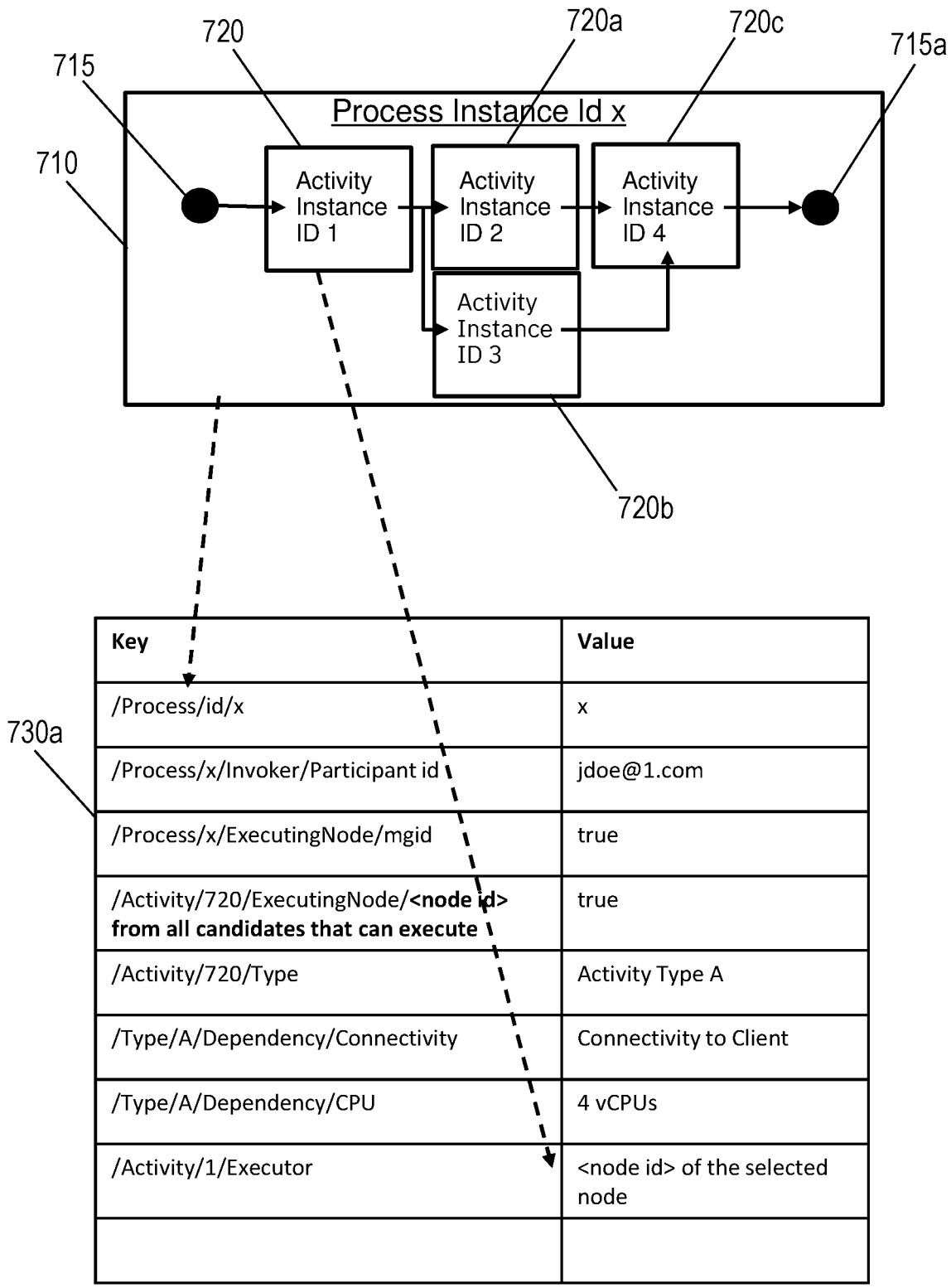

FIGS. 7A and 7B illustrate an example of generating a new migration activity in accordance with aspects of the invention. FIGS. 7A and 7B are described with reference to elements depicted in FIGS. 4, 5A-5F, 6A, and 6B. In embodiments, the cloud migration distributor module 430 of FIG. 4 obtains an activity wrapper 710 of migration activities 720, 720*a*, 720*b*, 720*c* and generates a new migration activity using the activity wrapper 710.

In embodiments, to migrate each data server within a distributed working set of the distributed working sets 610, 610*a*, 610*b*, 610*c*, each node of the nodes 520, 520*a*, 520*b*, 520*c* performs several migration activities 720, 720*a*, 720*b*, 720*c*. In embodiments, these migration activities occur under several migration processes. Examples of these migration processes include: a) checking if the tools 455, 475 are in a specific state; b) extracting a configuration of a server of the data servers 465, 465*a*, 465*b*, 465*c* to select corresponding tools of the tools 455, 475 in view of the configuration; c) starting a replication process to replicate the data server from the source location 450 to the target location 470; and d) performing a cutover to stop the replication of the data server once the data server is fully present in the target location 470.

In embodiments, each of these migration processes include a start stage 715 and an end stage 715*a*, with several migration activities 720, 720*a*, 720*b*, 720*c* between the start stage 715 and the end stage 715*a*. As an example, during the migration process of extracting a configuration of a data server of the data servers 465, 465*a*, 465*b*, 465*c*, a node of the nodes 520, 520*a*, 520*b*, 520*c* performs the migration activities 720, 720*a*, 720*b*, 720*c* of extracting information of which operating system a data server is running, extracting information of a number of CPUs a data server is utilizing, and extracting information of an amount of memory a data server is utilizing, amongst other migration activities. When performing each migration activity of the migration activities 720, 720*a*, 720*b*, 720*c*, a node writes the migration activities 720, 720*a*, 720*b*, 720*c* and a corresponding activity status 730 for each migration activity of the migration activities 720, 720*a*, 720*b*, 720*c* into an activity wrapper 710 in the repository 485. In this way, an activity wrapper 710 captures each activity request in a migration process or in a migration activity and represents the migration process and migration activities in the database 440. In embodiments, the activity wrapper 710 also defines dependencies for each migration activity of the migration activities 720, 720*a*, 720*b*, 720*c*. As an example, as shown in FIGS. 7A and 7B, migration activity 720*a* depends on migration activity 720, while migration activity 720*b* depends on migration activities 720, 720*a*, as shown in the activity wrapper 710 of FIGS. 7A and 7B.

In embodiments, the activity wrapper 710 includes the activity status 730 for the migration activity 720 for a specific migration process, along with various keys of information for the activity status 730. In embodiments, a migration practitioner of the migration practitioners 510, 510*a*, 510*b*, 510*c* enters the values for the keys. In further embodiments, the values for the keys are a no-sql key-value, amongst other code examples. As an example, the activity wrapper 710 includes the activity status 730 for the migration activity 720 for extracting a configuration of a data server of the data servers 465, 465*a*, 465*b*, 465*c*. In this example, keys of the activity request 730 include a Process ID, which represents which process is occurring. As a more specific example, the Process ID key indicates that the migration process of starting a replication process to replicate the data server from the source location 450 to the target location 470 is occurring, as indicated by "X." Another example of a key is a Participant ID for a migration practitioner. In this example, the Participant ID key represents an email address of the migration practitioner 510, e.g., "jdoe@1.com." Another example of a key is an Activity Type key, which represents which migration activity is occurring for this migration process. As a more specific example, the Activity Type key indicates the migration activity of extracting information of which operating system a data server is running, e.g., "Activity Type A." An example of another key is the Connectivity key, which indicates whether a node has connectivity to the source location 450 and/or the target location 470. Another example of a key is an Executor, which indicates which migration practitioner of the migration practitioners 510, 510*a*, 510*b*, 510*c* is performing this specific migration process, e.g., starting a replication process to replicate the data server from the source location 450 to the target location 470. In this example, the migration practitioner enters the value "Up-for-Takes" in response to being unable to complete the migration process for this activity wrapper 710.

In embodiments, the cloud migration distributor module 430 of FIG. 4 obtains the activity wrapper 710 from the repository 485. In embodiments, the cloud migration distributor module 430 periodically polls the repository 485 to obtain the activity wrapper 710 as a migration process is occurring. In this way, the cloud migration distributor module 430 intercepts the activity status 730 of the activity wrapper 710 since the process is still occurring and is not at the end stage 715*a*.

In embodiments, in response to obtaining the activity wrapper 710, the cloud migration distributor module 430 generates migration activities based on the obtained activity wrapper. Specifically, the cloud migration distributor module 430 uses the values for the keys of the activity status 730 to determine a status of the migration process. In embodiments, the cloud migration distributor module 430 uses the values to determine which migration process is occurring, which activity of the migration activities 720, 720*a*, 720*b*, 720*c* is occurring for this migration process, and who is the Executor for that migration activity. In embodiments, in response to the value of "Up-for-Takes," the cloud migration distributor module 430 assigns this migration activity of the migration activities 720, 720*a*, 720*b*, 720*c* to a migration practitioner since the "Up-for-Takes" value indicates no migration practitioner of the migration practitioners 510, 510*a*, 510*b*, 510*c* is performing this migration activity. In this way, the cloud migration distributor module 430 generates a new migration activity by assigning an activity to a migration practitioner.

In embodiments, to assign the migration activity, the cloud migration distributor module 430 notifies each node of the nodes 520, 520*a*, 520*b*, 520*c* that a migration activity is "Up-for-Takes" i.e., available, by sending a notification message for display on their respective node of the nodes 520, 520*a*, 520*b*, 520*c*. In embodiments, the notification message includes which migration activity is available, amongst other information. In embodiments, a node bids for the available migration activity by sending a message to the cloud migration distributor module 430. In further embodiments, a bidding node may respond with a bid automatically based on a policy (for example the policy may be set by the owner of the node to automatically 'agree' to a request). In response to receiving the bid, the cloud migration distributor module 430 access the node metadata of the bidding node from the repository 485. In response to the node metadata, the cloud migration distributor module 430 determines whether the bidding node satisfies requirements for that available migration activity. As an example of requirements, as shown in FIG. 7A, the available migration activity requires 4 virtual CPUs (vCPUs).

In embodiments, in response to determining that the bidding node satisfies the requirements of the available migration activity, the cloud migration distributor module 430 assigns the available migration activity to the bidding node. Alternatively, in response to determining that the bidding node does not satisfy the requirements of the available migration activity, the cloud migration distributor module 430 does not assign the available migration activity to the bidding node and continues to receive bids from other nodes. In this way, the cloud migration distributor module 430 generates work items, i.e., migration activities, by dynamically managing execution of the migration activities 720, 720*a*, 720*b*, 720*c* by other nodes of the nodes 520, 520*a*, 520*b*, 520*c* based on node capabilities. In embodiments, the cloud migration distributor module 430 generates the new migration activity, i.e., assigns the available migration activity, by creating entries in a new activity request 730*a* in the repository 485, which notifies the appropriate node to process the migration activity. As an example, the cloud migration distributor module 430 generates the new migration activity by creating a key-value pair like the one of "/Activity/720/ExecutingNode/<node id>: true," amongst other examples of creating entries. In alternative embodiments, the cloud migration distributor module 430 assigns the available migration activity based on policies, instead of a node bidding on the available migration activity. In embodiments, a policy indicates for the cloud migration distributor module 430 to choose a node with a relatively lowest latency. Alternatively, a policy indicates for the cloud migration distributor module 430 to choose a node with a relatively fewest failures.

Figure 8A:
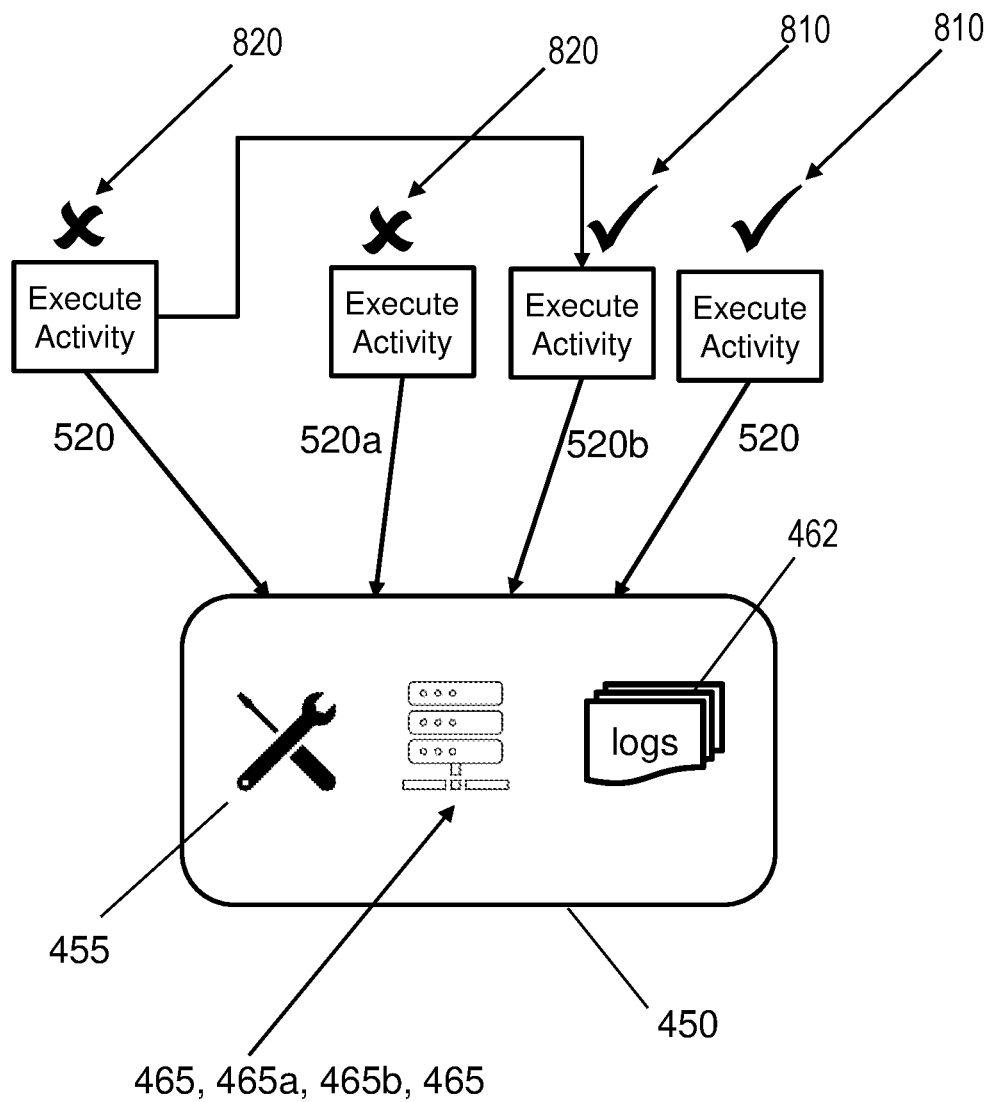

FIGS. 8A and 8B illustrate an example of resolving network connectivity problems for the nodes in accordance with aspects of the invention. FIGS. 8A and 8B are described with reference to elements depicted in in FIGS. 4, 5A-5FG, 6A, 6B, 7A and 7B. In embodiments, the cloud migration distributor module 430 of FIG. 4 resolves the connectivity problems in response to receiving a request from the nodes 520, 520*a*, 520*b*, 520*c*.

In embodiments, the cloud migration distributor module 430 receives requests to resolve networking connectivity problems for the nodes 520, 520*a*, 520*b*, 520*c*. In embodiments, a migration practitioner of the migration practitioners 510, 510*a*, 510*b*, 510*c* attempts to perform a migration activity through their respective node. Specifically, to perform the migration activity, the migration practitioner invokes a tool of the tools 455, and/or a data server of the data servers 465, 465*a*, 465*b*, 465*c*, and/or a service. However, after failing "n" number of times to invoke the tool and/or data server and/or the service, the migration practitioner determines there is a network connectivity problem in the network 515. In embodiments, the value for "n" is set by each migration practitioner, or by the cloud migration distributor module 430.

In embodiments, the cloud migration distributor module 430 receives a networking connectivity request to resolve the networking connectivity problem from the migration practitioner of the migration practitioners 510, 510*a*, 510*b*, 510*c* who is experiencing the network connectivity problem. In embodiments, the networking connectivity request states the activity that is at issue. In embodiments, in response to receiving the networking connectivity request, the cloud migration distributor module 430 determines there are connectivity problems in the network 515 of 520, 520*a*, 520*b*, 520*c*. In response to determining there are connectivity problems in the network 515, the cloud migration distributor module 430 sends a request to the other nodes of the nodes 520, 520*a*, 520*b*, 520*c* to confirm there is a network connectivity problem. In response to receiving the request, each remaining migration practitioner attempts to invoke the tool and/or data server and/or the service which the migration practitioner was unable to access. If a remaining migration practitioner is able to invoke the tool and/or data server and/or the service, this remaining migration practitioner sends a positive response to the cloud migration distributor module 430 indicating they are unable to access the tool and/or data server and/or the service. In embodiments, each migration practitioner which is able to invoke the tool and/or data server and/or the service updates the activity status 730 by creating an entry indicating they have access. As example, if migration practitioners 520b, 520c are able to access the tool and/or data server and/or the service, the migration practitioners 520b, 520c create the entries "/Activity/A/ExecuteOn/Node/R: true" and "/Activity/A/ExecuteOn/Node/S: true" in the activity status 730. Alternatively, if a remaining migration practitioner is unable to invoke the tool and/or data server and/or the service, this remaining migration practitioner sends a message to the cloud migration distributor module 430 indicating they are unable to access the tool and/or data server and/or the service.

In embodiments, in response to receiving a positive response from a node of the nodes 520, 520a, 520b, 520c, the cloud migration distributor module 430 accesses the node metadata of the node which sent the positive response from the repository 485. In response to the node metadata, the cloud migration distributor module 430 determines whether this node satisfies requirements for that available migration activity. For example, the cloud migration distributor module 430 determines whether this node satisfies the requirement of 4 CPUs. In response to satisfying the requirements for this migration activity, the cloud migration distributor module 430 assigns the migration activity to this node. By assigning the migration activity, resolves the connectivity problems in the network 515 of nodes 520, 520a, 520b, 520c.

Figure 9A:
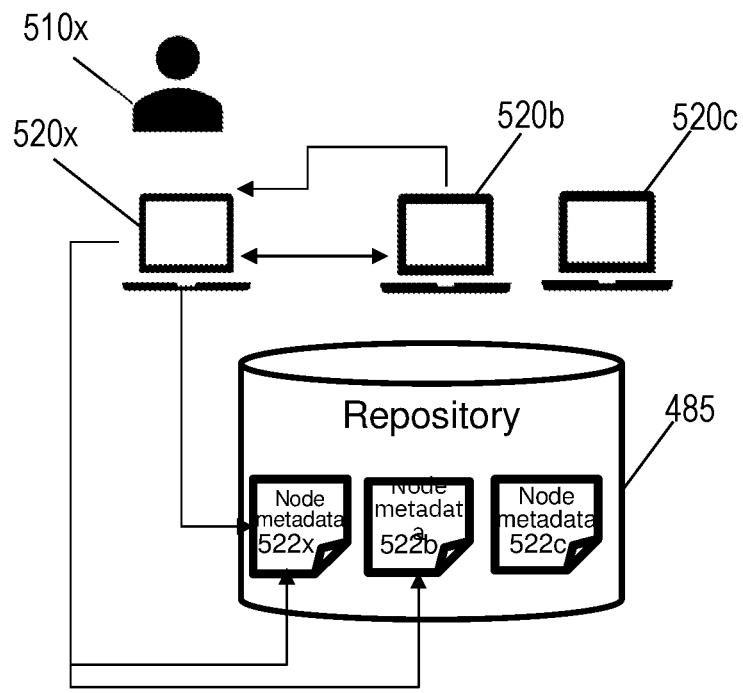
FIGS. 9A and 9B show a new node attempting to join in a network in accordance with aspects of the invention
Figure 9B:
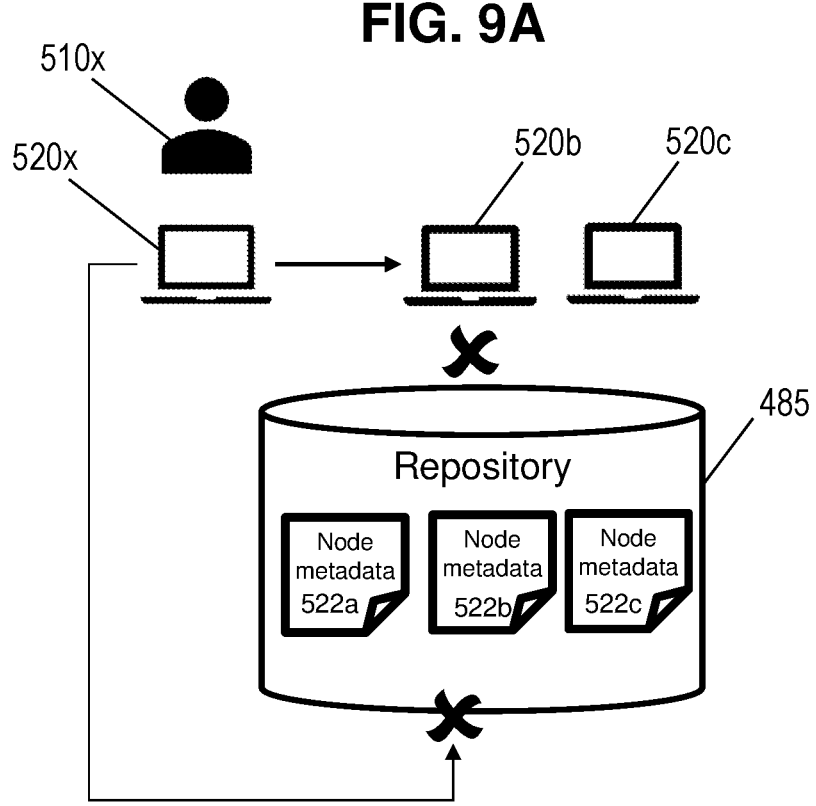

FIGS. 9A and 9B illustrate a new migration practitioner 510x and their respective node 520x attempting to join the network 515 in accordance with aspects of the invention. FIGS. 9A and 9B are described with reference to elements depicted in FIGS. 4, 5A-5G5F, 6A, 6B, 7A, 7B, 8A and 8B. In embodiments, the cloud migration distributor module 430 of FIG. 4 determines whether to allow the new migration practitioner 510x and their respective node 520x to join the network 515 or not.

In embodiments, the cloud migration distributor module 430 determines whether to allow a new migration practitioner 510x and their respective new node 520x to join the network 515 or not in response to receiving a request from the new migration practitioner 510x through the new node 520x to join the network. In embodiments, the migration practitioner 510x sends a join request to the cloud migration distributor module 430 requesting to join the network 515. In embodiments, the join request includes a name of the network 515, along with metadata 522x of the new node 520x. Examples of metadata of the new node 520x include the MAC address and the IP address of the new node 520x, amongst other information.

In embodiments, in response to receiving the join request from the new node 520x, the cloud migration distributor module 430 compares the node metadata 522x of the node 520x to the node metadata within the repository 485. In embodiments, if the cloud migration distributor module 430 determines there is a match between the node metadata of the node 520x and the node metadata within the repository 485, then the cloud migration distributor module 430 allows the new migration practitioner 510x and their respective new node 520x to join the network 515. As shown in FIG. 9A, by joining the network 515, the new migration practitioner 510x and their respective new node 520x are able to access the repository 485, and are also able to communicate with other nodes, e.g., nodes 510b, 510c, within the network 515. In embodiments, in response to the new node 520x joining, the cloud migration distributor module 430 assigns ownership to the new migration practitioner 510x over any unowned data server which a migration practitioner of the migration practitioners 510, 510a, 510b, 510c does not own. Specifically, the cloud migration distributor module 430 sends a message to the new node 520x of the new migration practitioner 510x indicating ownership to the unowned data server.

In alternative embodiments, if the node metadata of the node 520x does not match an existing node metadata within the repository 485, then the cloud migration distributor module 430 does not allow the new migration practitioner 510x and their respective new node 520x to join the network 515. As an example, the repository has node metadata 522a for node 520a, node metadata 522b for node 520b, and node metadata 522c for node 520c. In this example, the repository 485 does not contain node metadata 522x for new node 520x. Accordingly, the cloud migration distributor module 430 does not allow the new migration practitioner 510x and their respective new node 520x to join the network 515. As shown in FIG. 9B, by not joining the network 515, the new migration practitioner 510x and their respective new node 520x are unable to access the repository 485, and are also unable to communicate with other nodes, e.g., nodes 510b, 510c, within the network 515. In further embodiments, if the node metadata of the node 520x does not match existing node metadata within the repository 485, the cloud migration distributor module 430 polls the other migration practitioners 510, 510a, 510b, 510c through the nodes 520, 520a, 520b, 520c by sending them messages asking if they agree to allow the new migration practitioner 510x and the new node 520x to join the network. In embodiments, in response to receiving a majority of agrees, the cloud migration distributor module 430 allows the new migration practitioner 510x and the new node 520x to join the network 515. In this way, the cloud migration distributor module 430 allows for a consensus for joining a new migration practitioner 510x and a new node 520x to the network 515.

Figure 10A:
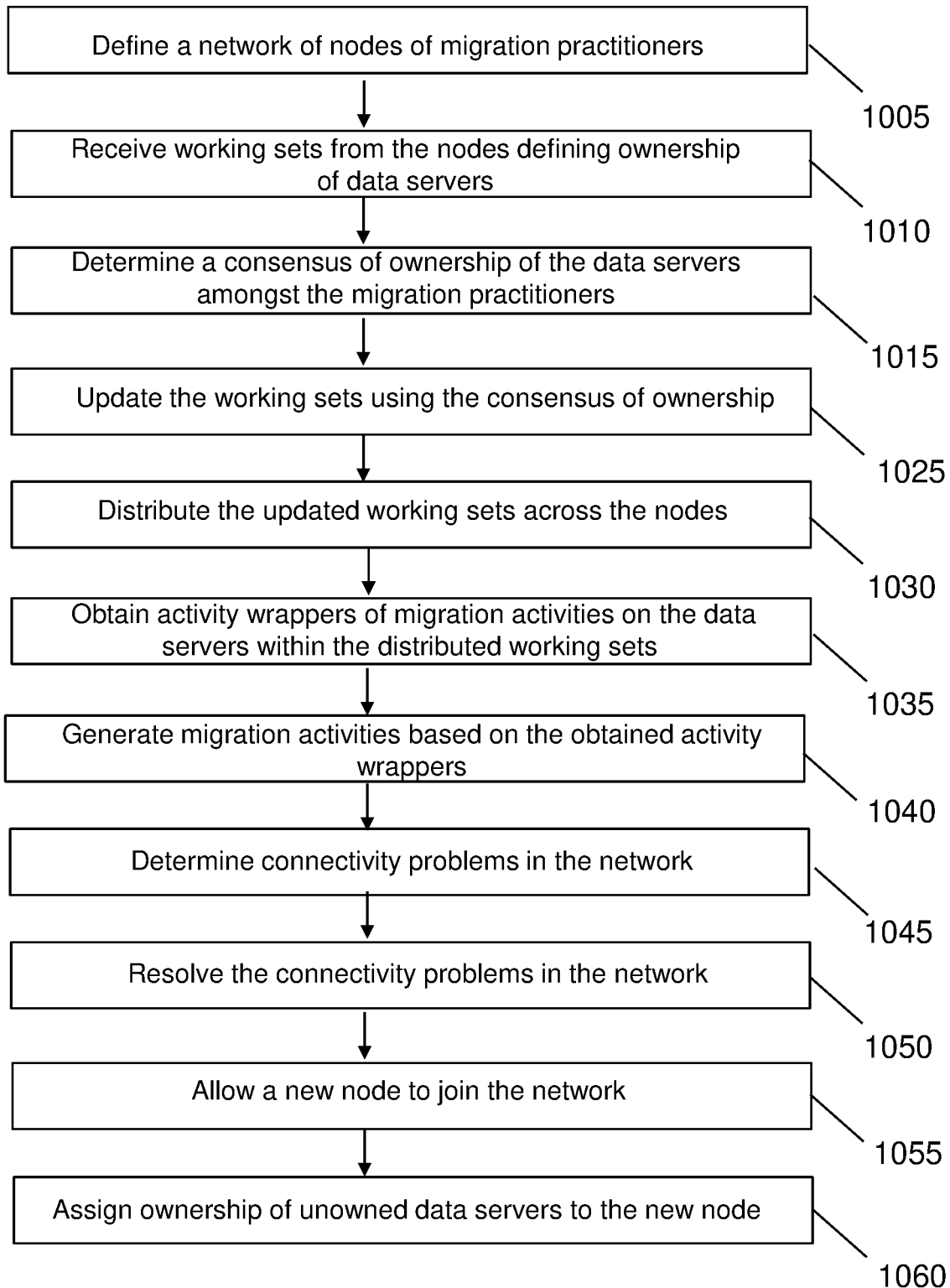
FIGS. 10A and 10B show a flowchart of an exemplary method for distributing cloud migration in accordance with aspects of the invention.
Figure 10B:
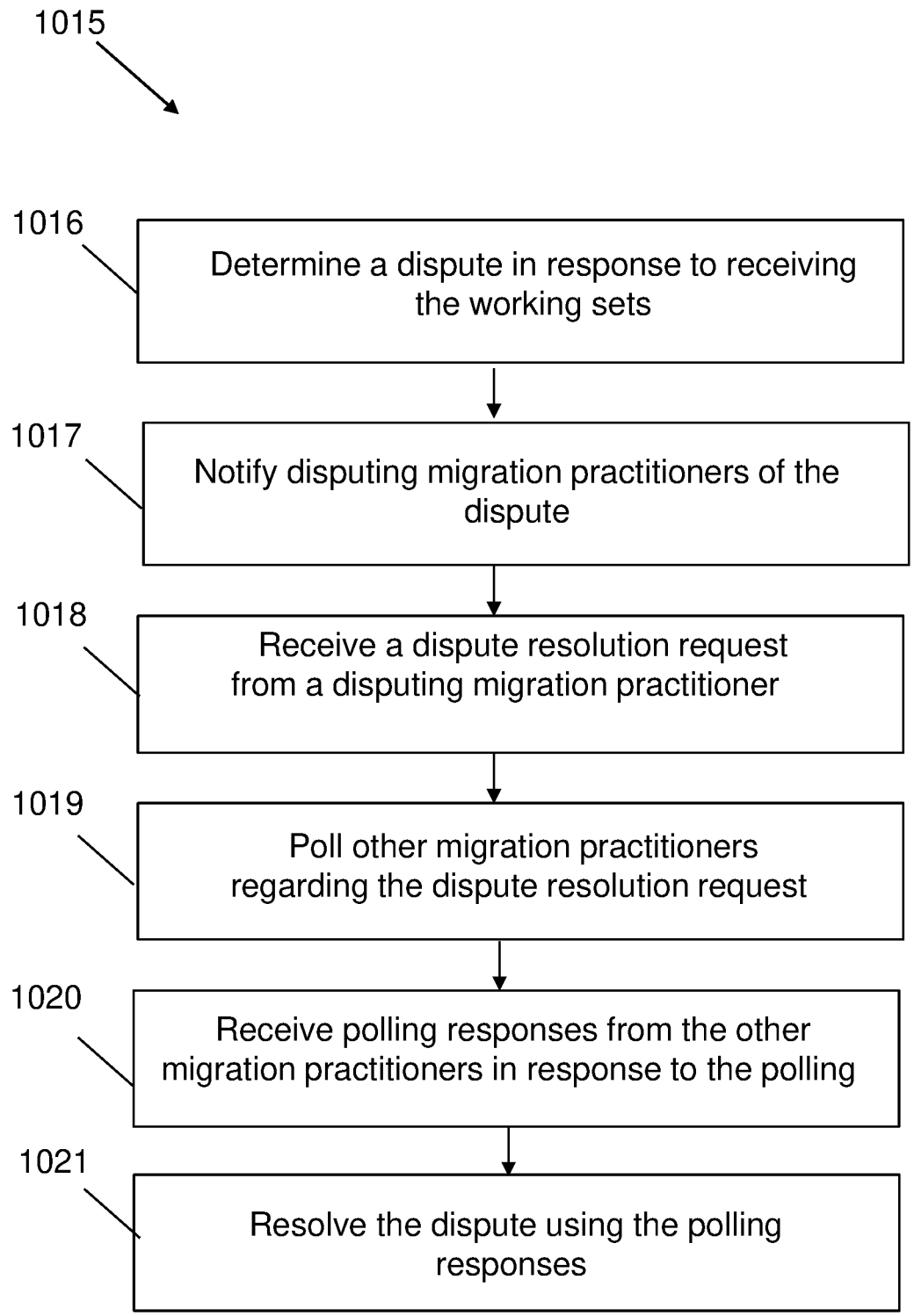

FIGS. 10A and 10B show flowcharts of an exemplary method in accordance with aspects of the present invention. Steps of the method may be carried out in the environment of FIG. 4 and are described with reference to elements depicted in FIGS. 4-9B.

At step 1005, the cloud migration distributor module 430 defines a network 515 of nodes 520, 520a, 520b, 520c of migration practitioners 510, 510a, 510b, 510c. In embodiments, and as described with respect to FIGS. 4-9B, the cloud migration distributor module 430 defines the network 515 by identifying node metadata 522, 522a, 522b, 522c of the nodes 520, 520a, 520b, 520c, and saving the metadata 522, 522a, 522b, 522c within the repository 485. In embodiments, the cloud migration distributor module 430 defines the network 515 as nodes 520, 520a, 520b, 520c which have node metadata 522, 522a, 522b, 522c in the repository 485.

At step 1010, the cloud migration distributor module 430 receives working sets 530, 530a, 530b, 530c from the nodes 520, 520a, 520b, 520c defining ownership of data servers 465, 465a, 465b, 465c. In embodiments, each migration practitioner of the migration practitioners 510, 510a, 510b, 510c defines which data servers of the data servers 465, 465a, 465b, 465c they are working on as a working set of the working sets 530, 530a, 530b, 530c. In embodiments, and as described with respect to FIGS. 4-9B, the cloud migration distributor module 430 receives the working sets 530, 530a, 530b, 530c from the migration practitioners 510, 510a, 510b, 510c through the network 410.

At step 1015, the cloud migration distributor module 430 determines a consensus of ownership of the data servers 465, 465a, 465b, 465c amongst the migration practitioners 510, 510a, 510b, 510c. In embodiments, the cloud migration distributor module 430 resolves any disputes of ownerships by determining a consensus of ownership.

In embodiments, steps 1016-1021 shown in FIG. 10B are sub-steps of step 1015 of FIG. 10A. At step 1016, the cloud migration distributor module 430 begins determining the consensus of ownership by determining a dispute in response to receiving the working sets. In embodiments, and as described with respect to FIGS. 4-9B, the cloud migration distributor module 430 determines a dispute exists when two or more working sets of the working sets 530, 530a, 530b, 530c define a same data server of the data servers 465, 465a, 465b, 465c.

At step 1017, the cloud migration distributor module 430 notifies disputing migration practitioners 510, 510a, 510b, 510c of the dispute. In embodiments, and as described with respect to FIGS. 4-9B, the cloud migration distributor module 430 sends notification messages to the two or more migration practitioners of the migration practitioners 510, 510a, 510b, 510c who are disputing over the data server. In embodiments, the cloud migration distributor module 430 sends the notification message to respective nodes of the two or more disputing migration practitioners through the network 410.

At step 1018, the cloud migration distributor module 430 receives a dispute resolution request 540 from a disputing migration practitioner. In embodiments, and as described with respect to FIGS. 4-9B, the cloud migration distributor module 430 receives the dispute resolution request from a node of the disputing migration practitioner through the network 410.

At step 1019, the cloud migration distributor module 430 polls other migration practitioners regarding the dispute resolution request 540. In embodiments, and as described with respect to FIGS. 4-9B, the cloud migration distributor module 430 polls the other migration practitioners by sending polling messages for display on their nodes through the network 410. In embodiments, each polling message includes a key which identifies an ownership request by the disputing migration practitioner and the data server they are requesting ownership over.

At step 1020, the cloud migration distributor module 430 receives responses from the other migration practitioners in response to the polling. In embodiments, and as described with respect to FIGS. 4-9B, the cloud migration distributor module 430 receives the responses from the nodes of the other migration practitioners through the network 410. In embodiments, each response of the responses includes a determination from a migration practitioner of the other migration practitioners regarding the ownership request of the disputing migration practitioner.

At step 1021, the cloud migration distributor module 430 resolves the dispute using the polling responses 545a, 545b, 545c. In embodiments, and as described with respect to FIGS. 4-9B, the cloud migration distributor module 430 counts a number of agrees and disagrees in the polling responses 545, 545a, 545b. In embodiments, if a majority of the polling responses 545, 545a, 545b agree with the ownership request of the dispute resolution request 540, then the cloud migration distributor module 430 determines that the consensus of ownership is that the disputing migration practitioner should own the data server in dispute.

At step 1025, the cloud migration distributor module 430 updates the working sets 530, 530a, 530b, 530c using the consensus of ownership. In embodiments, the cloud migration distributor module 430 updates the working sets 530, 530a, 530b, 530c by generating the updated working sets 560, 560a, 560b, 560c, which reflect the consensus of ownership.

At step 1030, the cloud migration distributor module 430 distributes the updated working sets 560, 560a, 560b, 560c. In embodiments, the cloud migration distributor module 430 updates the working sets 530, 530a, 530b, 530c by generating distributed working sets 610, 610a, 610b, 610c based on several factors. In embodiments, a first factor is node availability of the nodes 520, 520a, 520b, 520c. In embodiments, a second factor is a computing capacity of the nodes 520, 520a, 520b, 520c, in addition to the first factor or instead of the first factor. In embodiments, a third factor is network connectivity of the nodes 520, 520a, 520b, 520c in addition to any combination of the first factor and/or the second factor and/or instead of the first factor and second factor.

At step 1035, the cloud migration distributor module 430 obtains activity wrappers of migration activities 720, 720a, 720b, 720c on the data servers 465, 465a, 465b, 465c within the distributed working sets 610, 610a, 610b, 610c. In embodiments, the cloud migration distributor module 430 obtains an activity wrapper 710 from the repository 485. In embodiments, the cloud migration distributor module 430 periodically polls the repository 485 to obtain an activity wrapper 710 as a migration process is occurring.

At step 1040, the cloud migration distributor module 430 generates migration activities based on the obtained activity wrappers. In embodiments, the cloud migration distributor module 430 uses values for keys of the activity status 730 to determine a status of a migration process. In embodiments, in response to the value of "Up-for-Takes," the cloud migration distributor module 430 assigns this migration activity of the migration activities 720, 720a, 720b, 720c to a migration practitioner since the "Up-for-Takes." In embodiments, to assign the migration activity, receives a bid from a node and determines whether the bidding node satisfies the requirements for this migration activity. In embodiments, in response to determining the bidding node satisfies the requirements for this migration activity, the cloud migration distributor module 430 assigns the migration activity to the bidding node.

At step 1045, the cloud migration distributor module 430 determines connectivity problems in the network 515. In embodiments, the cloud migration distributor module 430 determines there are connectivity problems in the network 515 in response to receiving a networking connectivity request.

At step 1050, the cloud migration distributor module 430 resolves the connectivity problems in the network 515. In embodiments, the cloud migration distributor module 430 resolves the connectivity problems by sending a request to the other nodes of the nodes 520, 520a, 520b, 520c to confirm there is a network connectivity problem. In embodiments, in response to receiving a positive response from a node of the nodes 520, 520a, 520b, 520c, the cloud migration distributor module 430 access the node metadata of the node which sent the positive response from the repository 485. In response to the node metadata, the cloud migration distributor module 430 determines whether this node satisfies requirements for the migration activity which another node is unable to complete. In response to satisfying the requirements for this migration activity, the cloud migration distributor module 430 assigns the migration activity at issue to this node.

At step 1055, the cloud migration distributor module 430 allows a new node 520x to join the network 515. In embodiments, in response to receiving a join request from the new node 520x, the cloud migration distributor module 430 compares the node metadata 522x of the node 520x to the node metadata within the repository 485. In embodiments, if the new metadata of the node 520x matches the node metadata within the repository 485, then the cloud migration distributor module 430 allows the new node 520x to join the network 515.

At step 1060, the cloud migration distributor module 430 assigns ownership of unowned data servers to the new node 520x. In embodiments, in response to the new node 520x joining, the cloud migration distributor module 430 assigns ownership to the new migration practitioner 510x over any unowned data server which a migration practitioner of the migration practitioners 510, 510a, 510b, 510c does not own. Specifically, the cloud migration distributor module 430 sends a message to the new node 520x of the new migration practitioner 510x indicating ownership to the unowned data server.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   defining, by a computing device, a network of nodes of migration practitioners;
   receiving, by the computing device, working sets from the nodes defining ownership of data servers;
   determining, by the computing device, a consensus of ownership of the data servers amongst the migration practitioners;
   updating, by the computing device, the working sets using the consensus of ownership;
   distributing, by the computing device, the updated working sets across the nodes;
   obtaining, by the computing device, activity wrappers of migration activities on the data servers within the distributed working sets;
   generating, by the computing device, migration activities based on the obtained activity wrappers;
   determining, by the computing device, connectivity problems in the network;
   resolving, by the computing device, the connectivity problems in the network;
   allowing, by the computing device, a new node to join the network; and
   assigning, by the computing device, ownership of unowned data servers to the new node.

2. The method of claim 1, wherein the determining the consensus of ownership includes determining a dispute in response to receiving the working sets.

3. The method of claim 1, wherein the determining the consensus of ownership includes notifying disputing migration practitioners of the migration practitioners of a dispute.

4. The method of claim 1, wherein the determining the consensus of ownership includes receiving a dispute resolution request from a disputing migration practitioner of the migration practitioners.

5. The method of claim 1, wherein the determining the consensus of ownership includes polling the migration practitioners regarding a dispute resolution request.

6. The method of claim 1, wherein the determining the consensus of ownership includes receiving polling responses from the migration practitioners in response to a dispute resolution request.

7. The method of claim 6, wherein the determining the consensus of ownership includes resolving the dispute resolution request using the polling responses.

8. The method of claim 1, further comprising receiving migration states for each data server of the data servers.

9. The method of claim 1, wherein the distributing the updated working sets includes generating the distributed working sets based on node availability of the nodes.

10. The method of claim 1, wherein the distributing the updated working sets includes generating the distributed working sets based on a computing capacity of the nodes.

11. The method of claim 1, wherein the distributing the updated working sets includes generating the distributed working sets based on network connectivity of the nodes.

12. The method of claim 1, wherein the computing device includes software provided as a service in a cloud environment.

13. A computer program product comprising one or more computer readable storage media having program instructions collectively stored on the one or more computer readable storage media, the program instructions executable to:
   identify node metadata of nodes of migration practitioners;
   define a network of the nodes using the node metadata;
   receive working sets from the nodes defining ownership of data servers;
   determine a consensus of ownership of the data servers amongst the migration practitioners;
   update the working sets using the consensus of ownership;
   distribute the updated working sets across the nodes;
   obtain activity wrappers of migration activities on the data servers within the distributed working sets;

generate migration activities based on the obtained activity wrappers;
determine connectivity problems in the network;
resolve the connectivity problems in the network;
allow a new node to join the network; and
assign ownership of unowned data servers to the new node.

14. The computer program product of claim 13, wherein the program instructions are executable to compare new metadata of the new node to the node metadata.

15. The computer program product of claim 14, wherein the program instructions are executable to determine a match between new metadata of the new node and the node metadata.

16. The computer program product of claim 13, wherein the program instructions are executable to determine a dispute in response to receiving the working sets.

17. A system comprising:
a processor, a computer readable memory, one or more computer readable storage media, and program instructions collectively stored on the one or more computer readable storage media, the program instructions executable to:
identify node metadata of nodes of migration practitioners;
define a network of the nodes using the node metadata;
receive working sets from the nodes defining ownership of data servers;
determine a consensus of ownership of the data servers amongst the migration practitioners;
update the working sets using the consensus of ownership;
distribute the updated working sets across the nodes using;
receive migration states of the data servers;
obtain activity wrappers of migration activities on the data servers within the distributed working sets;
generate migration activities based on the obtained activity wrappers;
determine connectivity problems in the network;
resolve the connectivity problems in the network;
allow a new node to join the network; and
assign ownership of unowned data servers to the new node.

18. The system of claim 17, wherein the program instructions are executable to determine a dispute in response to receiving the working sets.

19. The system of claim 17, wherein the program instructions are executable to notify migration practitioners of a dispute.

20. The system of claim 17, wherein the program instructions are executable to poll the migration practitioners regarding a dispute resolution request.

\* \* \* \* \*